United States Patent
Yamashita et al.

[11] Patent Number: 6,157,599
[45] Date of Patent: *Dec. 5, 2000

[54] OPTICAL STORAGE APPARATUS

[75] Inventors: Tomonori Yamashita, Kato-gun; Shigenori Yanagi, Kawasaki, both of Japan

[73] Assignee: Fujitsu Limited, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/022,430

[22] Filed: Feb. 12, 1998

[30] Foreign Application Priority Data

Aug. 28, 1997 [JP] Japan ................................. 9-232158

[51] Int. Cl.⁷ ........................................... G11B 7/00
[52] U.S. Cl. ................... 369/44.28; 369/44.29; 369/44.32
[58] Field of Search .................. 369/32, 44.25, 369/44.26, 44.27, 44.28, 44.29, 44.32, 44.34, 44.35, 47, 54, 58; 360/78.04, 78.06, 78.14

[56] References Cited

U.S. PATENT DOCUMENTS 5,457,671 10/1995 Takata et al. ..................... 369/44.28
5,623,461 4/1997 Sohmuta ................................. 369/32

FOREIGN PATENT DOCUMENTS

| 422851 | 4/1991 | European Pat. Off. . |
| 806766 | 11/1997 | European Pat. Off. . |
| 58-185043 | 10/1983 | Japan . |
| 62-154273 | 7/1987 | Japan . |
| 62-231430 | 10/1987 | Japan . |
| 1196737 | 8/1989 | Japan . |
| 4132021 | 5/1992 | Japan . |
| 4291025 | 10/1992 | Japan . |
| 5081799 | 4/1993 | Japan . |

*Primary Examiner*—Paul W. Huber
*Attorney, Agent, or Firm*—Greer, Burns & Crain, Ltd.

[57] ABSTRACT

In a low speed seek control unit, when it is judged by an error detection judging unit that a zero-cross error detection has occurred during a seeking operation, a speed prediction calculating unit predictively calculates a correct speed on the basis of the last track zero-cross interval free from any error detection and supplies the predicted speed in place of a detected speed to a speed control unit for the execution of a speed control, while a counter modification unit returns a track counter so as to have a value before the error detection. In a high speed seek control unit, when it is judged by an error detection judging unit that a zero-cross error detection has occurred, a speed prediction calculating unit predictively calculates a correct speed and supplies the predicted speed in place of a detected speed to a speed control unit for the execution of a speed control, while a counter modification unit modifies a track counter so as to have a correct value.

23 Claims, 18 Drawing Sheets

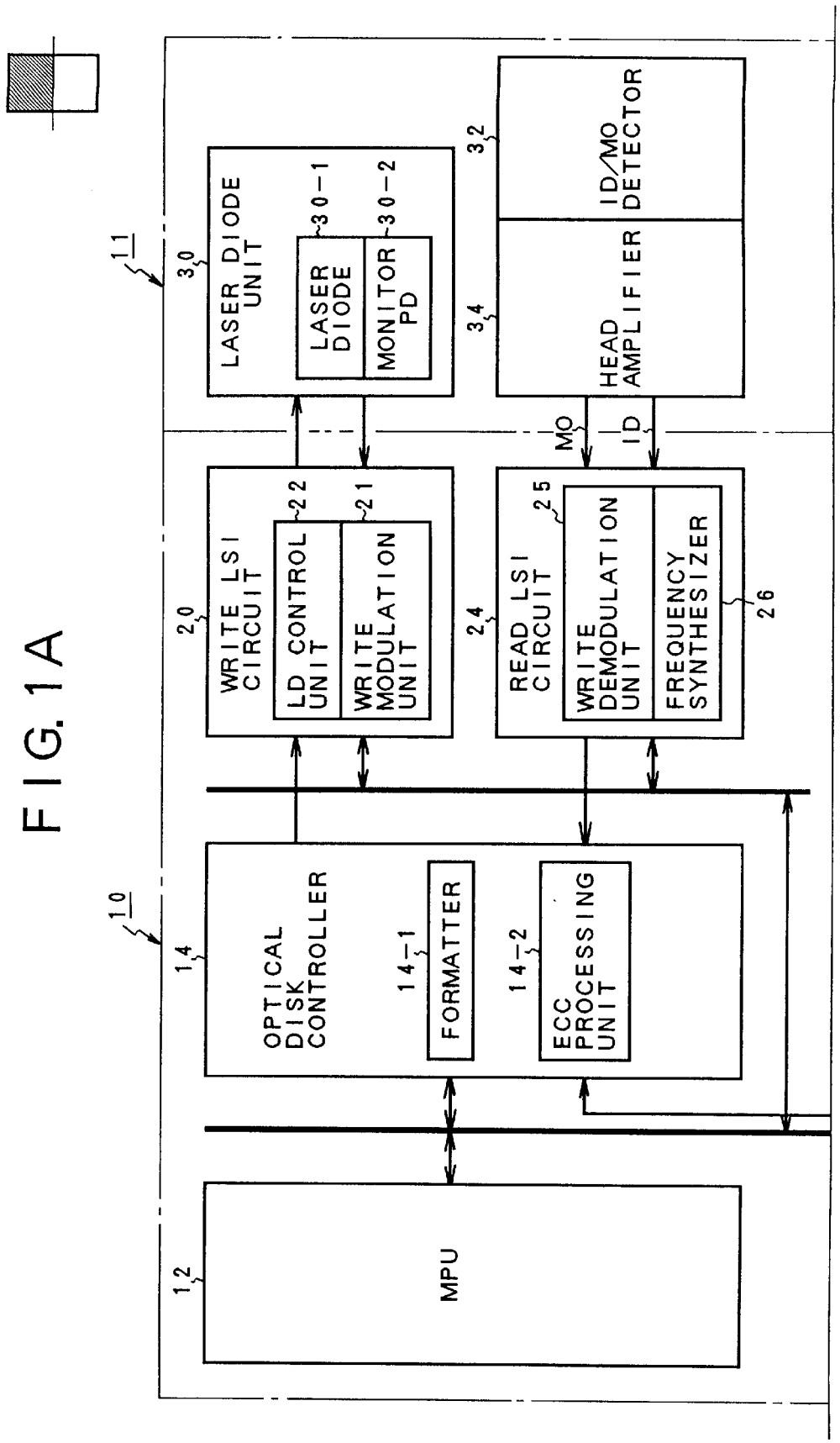

FIG. 4

| CONTROL MODE | STATE OF SWITCH CONTROL | | | | | | |
|---|---|---|---|---|---|---|---|
| | SW98 | SW118 | SW142 | SW156 | SW186 | SW178 |
| FOCUS OFF | 0 | 0 | 0 | 1 | 0 | 0 |
| TRACK OFF | 1 | 0 | 0 | 1 | 0 | 0 |
| TRACK ON | 1 | 0 | 1 | 0 | 1 | 0 |
| FINE SEEK | 1 | 1 | 0 | 0 | 1 | 1 |
| POSITION SEEK | 1 | 0 | 0 | 1 | 0 | 1 |

FIG. 5

| CONTROL MODE | CONTENT OF CONTROL |
|---|---|
| FOCUS OFF | TURN OFF THE FOCUS SERVO AND CONTROL THE LENS ACTUATOR TO THE ZERO POSITION BY A LENS POSITION SIGNAL. |
| TRACK OFF | TURN ON THE FOCUS SERVO AND CONTROL THE LENS ACTUATOR TO THE ZERO POSITION BY A LENS POSITION SIGNAL. |
| TRACK ON | TURN ON THE FOCUS SERVO AND ON-TRACK CONTROL THE LENS ACTUATOR BY A TRACKING ERROR SIGNAL. |
| FINE SEEK | TURN ON THE FOCUS SERVO. SPEED CONTROL THE LENS ACTUATOR. FEEDFORWARD CONTROL VCM CONTROL VCM TO THE LENS ZERO POSITION BY A LENS POSITION SIGNAL (DOUBLE SERVO). |
| POSITION SEEK | TURN ON THE FOCUS SERVO. CONTROL THE LENS ACTUATOR TO THE ZERO POSITION BY A LENS POSITION SIGNAL. POSITION CONTROL TO THE TARGET TRACK BY VCM |

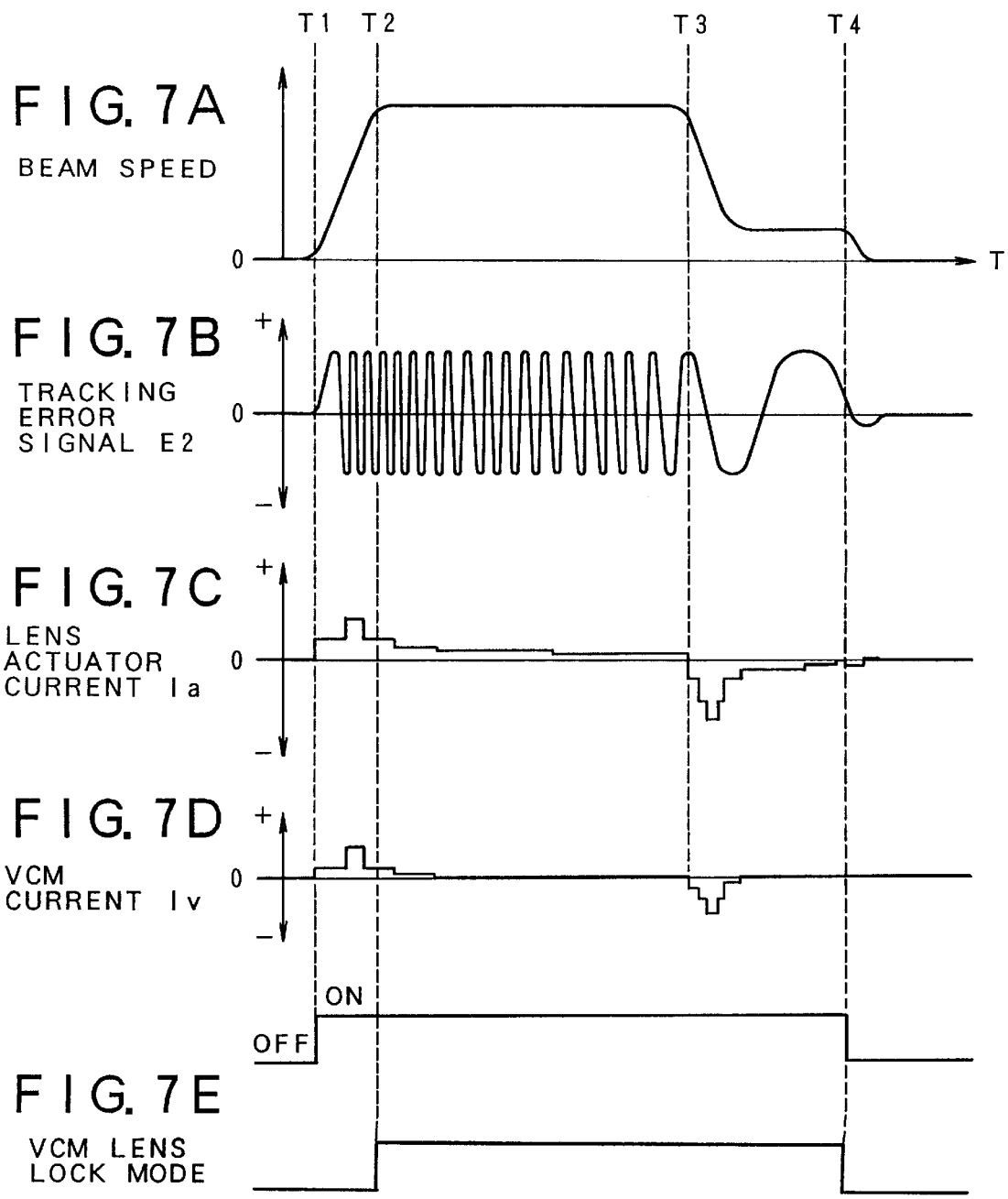

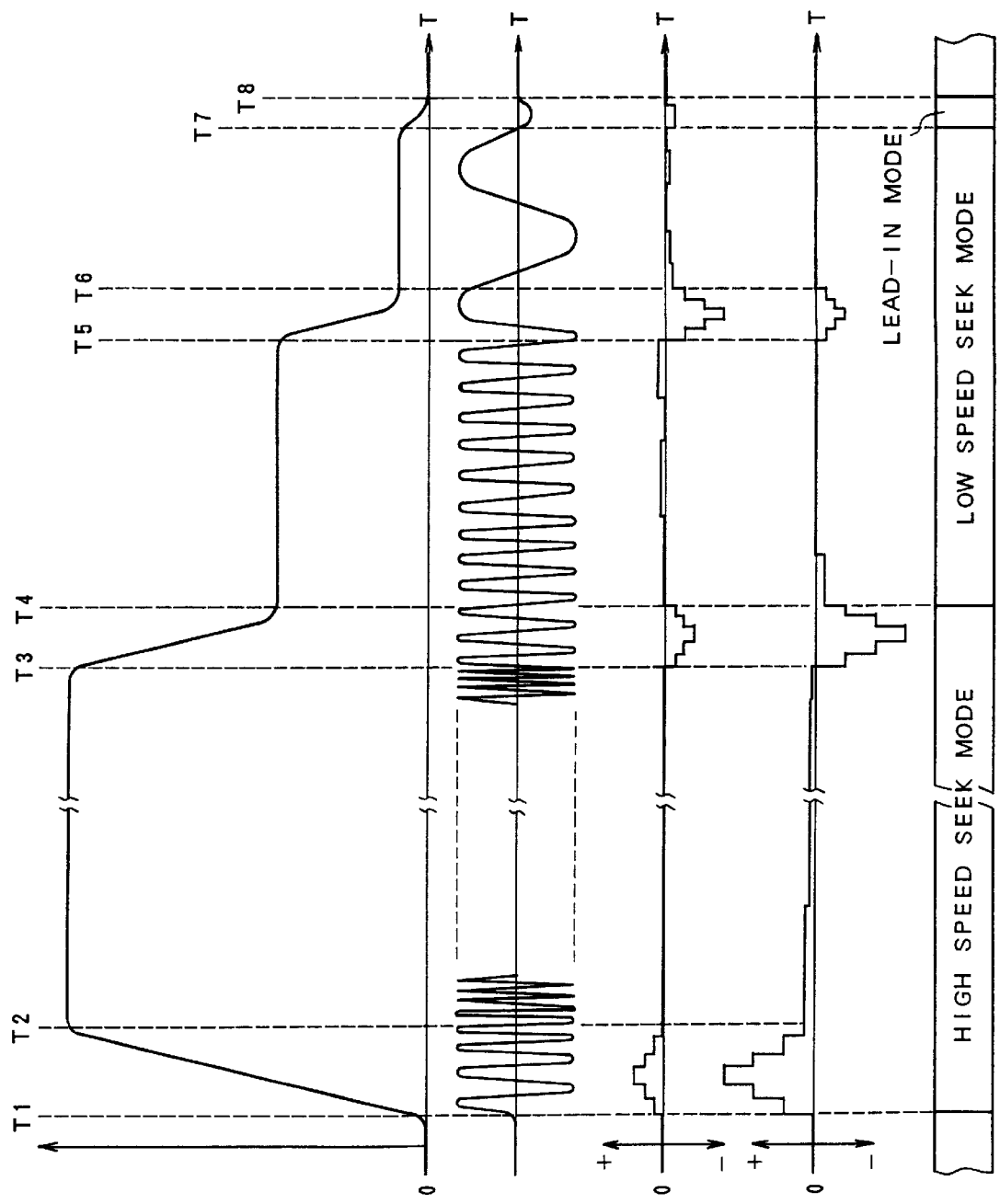
FIG. 8A BEAM SPEED
FIG. 8B TRACKING ERROR SIGNAL E2
FIG. 8C LENS ACTUATOR CURRENT Ia
FIG. 8D VCM CURRENT Iv
FIG. 8E CONTROL MODE

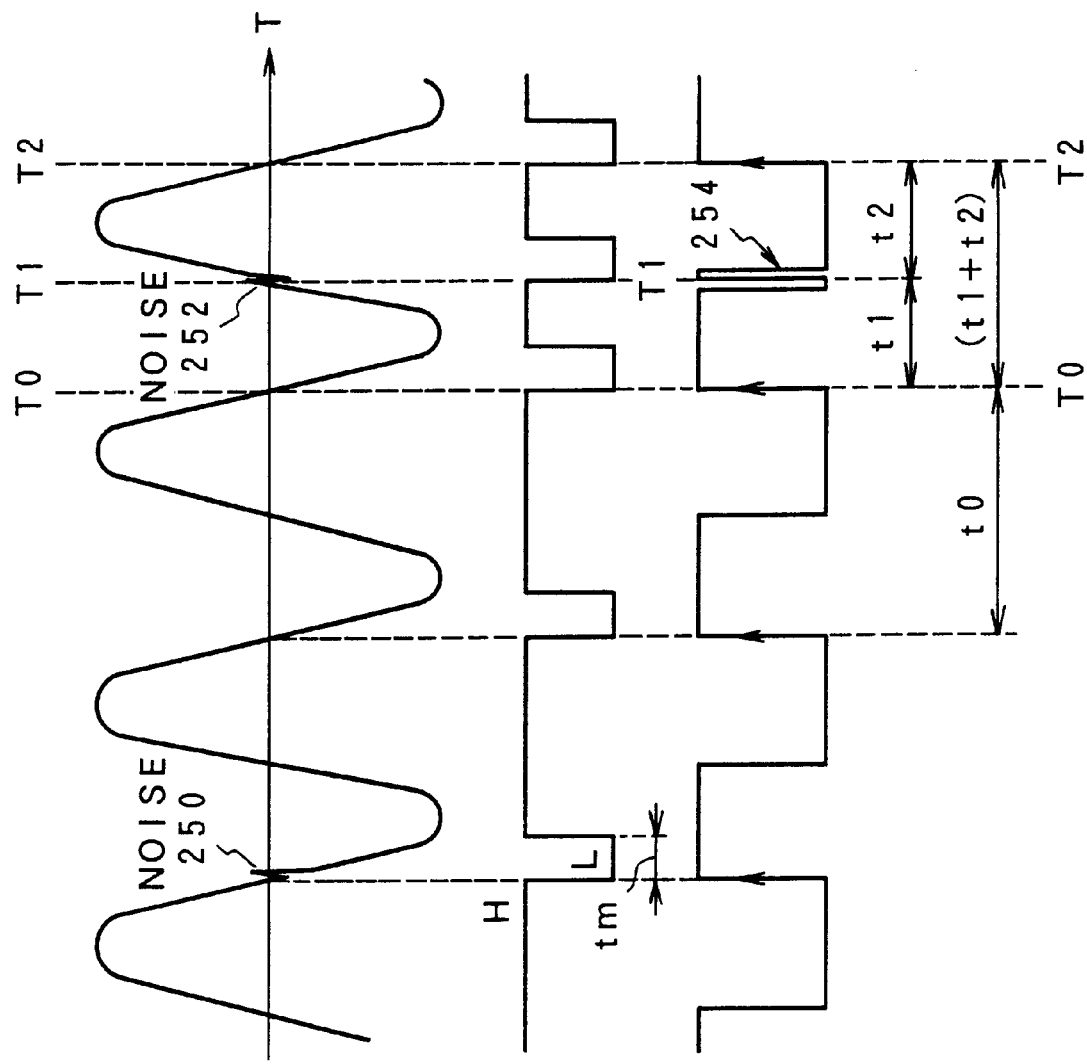

OPTICAL STORAGE APPARATUS

BACKGROUND OF THE INVENTION

1. Field of the Invention

The present invention relates generally to an optical storage apparatus for optically recording and reproducing information on/from a removable medium such as an MO cartridge, and more particularly to an optical storage apparatus capable of appropriately dealing with any zero-cross error detection arising from ID fields or noises of the medium in a seek control in which the number of tracks are counted in response to the zero-cross detection of a tracking error signal.

2. Description of the Related Art

A lot of attention is being paid to optical disks as storage media, which are indispensable elements in recently rapidly developing multimedia. In case of e.g., a 3.5-inch MO cartridge, there are provided in recent years high density recording media having a memory capacity of 540 MB or 640 MB, in addition to a conventional 128 MB or 230 MB types.

An optical storage apparatus known as an optical disk drive for making use of such an MO cartridge medium performs, upon a reception of a write instruction or a read instruction from a host apparatus, a seek control for positioning a beam of light at a target track designated on a medium. The seek control is divided into a long seek in which the number of tracks up to a target track is more than e.g., 50 tracks and a short seek in which it is less than 50 tracks. In the long seek, a carriage is first sought at a high speed through the speed control of a VCM, and when the number of remaining tracks reaches 50 tracks, the seek is switched to a low speed seek through the speed control of a lens actuator, to move the beam of light to the target track. When the beam of light has reached the target track, control is switched to a position control to lead in the beam of light on the track center, and after the completion of settling, sequence goes to read or write operation. The speed control of the VCM and the lens actuator during the seeking operation is a control following the target speed set in response to the number of tracks up to the target track and has acceleration, constant and deceleration speed profiles. In the short seek in which the number of tracks up to the target track is less than 50 tracks, the low speed seek through the speed control of the lens actuator is initially used and the lead-in operation is carried out when the beam of light reaches the target track. The target speed set in the speed control for the high speed seek and the low speed seek is set in response to the number of remaining tracks to be crossed to reach the target track. For this reason, a track counter is provided which indicates a current position of the beam. The track counter counts the number of track zero-cross pulses generated in response to the detection of zero-crossing of the tracking error signal. The number of tracks up to the target track from the current position is preset in the track counter, which counts down during a seek in the inner or outer direction to at all times indicate the number of tracks up to the target track.

In the conventional optical storage apparatus, however, the tracking error signal obtained during the seek is subjected to a waveform distortion arising from a variation of return light from a physical pit formed on the ID unit. If this waveform distortion occurs at or near the zero-crossing of the tracking error signal, a track zero-cross error detection may take place. The similar track zero-cross error detection may also occur when noise is applied at the timing near the zero-crossing of the tracking error signal. If a track zero-cross error occurs during the seek, the count value of the track counter may undergo an error. In the speed control during the seek, the beam of light speed is detected on the basis of the count value of the track counter, so that if the track counter misses in counting, an erroneous speed is detected, leading to an unstable seek control. In addition, the miscount of the track counter results in an incorrect value of the number of remaining tracks to be crossed to reach the target track, making it impossible to position the beam of light at the target track, bringing about a seek error. The seek error would necessitates a retry seek in which the miss seek track ID is read to recognize the current track to again perform a seek at the target track, resulting in poor access properties.

SUMMARY OF THE INVENTION

According to the present invention, there is provided an optical storage apparatus capable of judging a zero-cross error detection of a tacking error signal attributable to ID fields or noises of a medium, to ensure a stabilized seek control and a secure positioning of a beam of light at a target track.

The optical storage apparatus of the present invention comprises a lens actuator for moving an objective lens through which a beam of light falls on a medium, to the direction across tracks of the medium; a carriage actuator for moving a carriage on which the lens actuator is mounted, to the direction across the tracks of the medium; a tracking error signal generating circuit for generating a tracking error signal in response to a position of the beam of light in the direction across the tracks, on the basis of a photosensitive output of a return light from the medium; a high speed seek control unit for moving at a high speed a beam of light up to a target track, through a speed control of the carriage actuator; and a low speed seek control unit for moving at a low speed a beam of light up to a target track, through a speed control of the actuator lens.

(Zero-cross Error Detection During Low Speed Seek)

In such an optical storage apparatus of the present invention, the low speed seek control unit comprises in order to perform a speed control during a seek operation, a track counter which counts down every track zero-cross detection of a tracking error signal detected by a zero-cross detection unit (TZC circuit) to indicate the number of remaining tracks up to a target track; an interval detection unit for detecting an interval of the track zero-crossing; a speed control unit which detects a speed of a beam of light on the basis of the track zero-cross interval, sets a target speed on the basis of the number of remaining tracks up to the target track in the seeking operation, detects a speed error between the target speed and a detected speed, and drives the lens actuator by a current obtained by multiplying the speed error by a predetermined gain, to allow the detection speed of the beam of light to follow the target speed. The low speed control unit of the present invention comprises in addition to these, an error detection judging unit for judging an error detection by the zero-cross detection circuit in the seeking operation; and a speed prediction calculating unit which when it is judged that a zero-cross error detection has occurred during the seeking operation, predictively calculates a correct speed on the basis of the last track zero-cross interval free from any error detection and supplies the predicted speed in place of the detected speed to the speed control unit for the execution of speed control. By virtue of such a configuration, even though a zero-cross error detection of the tracking error signal has occurred due to ID fields or noises during the low speed seek, this zero-cross error detection is judged, enabling a proper speed in the error detection free state to be predicted for the speed control, contributing to a stabilized seek control.

The error detection judging unit judges that a zero-cross error detection has occurred if the track zero-cross interval t1 varies beyond a predetermined range based on the last track zero-cross interval t0. The error detection judging unit may judge that a zero-cross error detection has occurred if a detection speed V1 obtained from the track zero-cross interval t1 varies beyond a predetermined range based on a detection speed V0 obtained from the last track zero-cross interval t0. The error detection judging unit can judge that a zero-cross error detection has occurred if an acceleration α 1 obtained from the track zero-cross interval t1 varies beyond a predetermined range based on an acceleration α 0 obtained from the last track zero-cross interval t0. In the three different judging processes executed by the error detection judging unit, a zero-cross error detection is judged if for example the current value varies beyond a range defined by the upper limit and lower limit obtained by multiplying the last value by ±30%.

The speed prediction calculating unit predictively calculates a correct speed V1p on the basis of the interval t1 by a zero-cross error detection and a detection speed V1 and of the last zero-cross interval t0 free from any error detection. That is, the speed prediction calculating unit calculates a prediction speed V1p from $$V1p=V1(t1/t0)$$

For more accurate prediction, the speed prediction calculating unit calculates a prediction speed V1p, using a current I [ampere] fed to the lens actuator, an acceleration property A [G/ampere] and the interval t1 by the a zero-cross error detection, from $$V1p=V1(t1/t0)+9.8 \cdot A \cdot I \cdot t1$$

The speed control unit, when detecting a speed error between a predicted speed V1p of the speed prediction calculating unit and the target speed, modifies the gain G on the basis of the interval t1 at the time of zero-cross error detection and of the last zero-cross interval t0 free from any error detection. That is, the speed control unit calculates a modified gain Ga from $$Ga=G(t1/t0)$$

This attributes to a fact that the gain G is determined on the assumption that the drive current for the lens actuator by the low speed seek speed control is controlled for each track pitch Tp. However, if a zero-cross error detection occurs, the drive current is caused to flow halfway in one track pitch Tp (current switching), so that it is impossible to use the gain G defined for each track pitch Tp. Thus, a modification for reducing the gain G to (t1/t0) is carried out.

Another form of the speed prediction calculating unit in the seek control unit of the present invention predictively calculates a speed on the basis of a time (t1+t2) obtained from adding the first interval t1 up to a zero-cross error detection and a second interval t2 from the zero-cross error detection up to the next zero-cross detection. That is, the speed prediction calculating units calculates a prediction speed Vp from $$Vp=Tp/(t1+t2)$$

where Tp is a track pitch.

In this case, there is no need for modifying the gain G since it is processing for each one track pitch Tp. The low speed seek control unit of the present invention further comprises a counter modification unit for returning the count value of the track counter to a pre-detection value at the time of the zero-cross error detection. For this reason, even though a zero-cross error detection has occurred during the low speed seek, the count value of the track counter is not allowed to indicate an incorrect value, ensuring a precise positioning at a target track and eliminating a need for any retry arising from a seek error. The low speed seek control unit of the present invention further comprises a mask processing unit for inhibiting an input of a tracking error signal into the zero-cross detection circuit for a predetermined time from the zero-cross detection, to thereby prevent any zero-cross error detection. The mask processing immediate after the zero-cross detection allows a prevention of zero-cross error detection due to ID fields or noises immediately after the zero-cross detection.

(Zero-cross Error Detection During High Speed Seek)

In the optical storage apparatus of the present invention, the high speed seek control unit comprises for the speed control during the high speed seeking operation, a track counter which counts the number of times of track zero-cross detection of the tracking error signal by the zero-cross detection unit to indicate the current track position by this count value; a latch unit for latching a count value of the track counter every predetermined sampling cycle ts which is so set as to be longer than the longest track zero-cross cycle in the high speed seek; and a speed control unit which detects a speed of a beam of light on the basis of a difference between the current and the last count values which have been latched by the latch unit, sets a target speed on the basis of the number of remaining tracks up to the target track in the seeking operation, detects a speed error between the target speed and a detected speed, and drives the lens actuator by a current obtained by multiplying the speed error by a predetermined gain, to allow the detection speed of the beam of light to follow the target speed. Such a high speed seek control unit of the present invention further comprises an error detection judging unit for judging an error detection by the zero-cross detection circuit in the seeking operation; a speed prediction calculating unit which when it is judged by the error detection judging unit that a zero-cross error detection has occurred, predictively calculates a correct speed and supplies the predicted speed in place of the detected speed to the speed control unit for the execution of speed control; and a counter modification unit which upon the zero-cross error detection, modifies the count value of the track counter to a correct value. For this reason, even though a zero-cross error detection of the tracking error signal has occurred during a high speed seek, this zero-cross error detection is judged, allowing a correct speed in the error detection free state to be predicted for the speed control, contributing a stabilized high speed seek control. Furthermore, even though a zero-cross error detection has occurred during a low speed seek, the count value of the track counter is modified, ensuring a precise positioning at a target track after the shift to the low speed seek, to eliminate a need for retry arising from a seek error.

The error detection judging unit predicts a speed V1 p at the current latch timing from an acceleration property A [G/ampere] and a drive current I [ampere] of the actuator which has been controlled at the last latch timing and judges that the zero-cross error detection has occurred if a difference between the current predicted speed V1p and the detected speed V1 exceeds a predetermined value. The error detection unit may judge that the zero-cross error detection has occurred if an acceleration α obtained from a speed V0 at the last latch timing and from a speed V1 at the current latch timing is less than a predetermined rate of an acceleration α p predicted from a drive current I flowing through the carriage actuator at the last latch timing. In this case, the error detection judging unit judges that the zero-cross error detection has occurred if the detected acceleration α is not more than a threshold value α th obtained by multiplying the predicted acceleration α p by 70%. The speed prediction calculating unit calculates a predicted speed V2p at the current latch timing, on the basis of a detected speed V0 at the last latch timing, a drive current I [ampere] for the carriage actuator at the last latch timing, an acceleration performance A [G/ampere] of the carriage actuator and a sampling cycle ts of the latch unit. The predicted speed V1p can be obtained from $$V1p = V0 + 9.8 \cdot A \cdot I \cdot ts$$

The counter modification unit predictively calculates a variation ΔN of the track counter throughout a sampling cycle ts, on the basis of a predicted speed Vp calculated by the speed prediction calculating unit, and modifies the count value of the track counter to a correct count value by adding the variation ΔV to the last count value. That is, the counter modification unit calculates a variation ΔN of the track counter throughout a sampling cycle ts from $$\Delta N = Vp \cdot ts / Tp$$

where Vp is the predicted speed, ts is a sampling cycle and Tp is a track pitch, and
modifies the count value of the track counter to a correct count value by adding the variation ΔN to the last count value.

The above and other objects, aspects, features and advantages of the present invention will become more apparent from the following detailed description with reference to the accompanying drawings.

BRIEF DESCRIPTION OF THE DRAWINGS

FIGS. 1A and 1B are block diagrams of an optical disk drive in accordance with the present invention;

FIG. 4 is an on/off explanatory diagram of servo control modes of analog switches shown in FIGS. 3A and 3B;

FIG. 5 is an explanatory diagram of the servo control modes of FIG. 4;

FIGS. 7A to 7E are time charts at the time of low speed seek control;

FIGS. 8A to 8E are time charts at the time of high speed seek control;

FIGS. 10A to 10C are time charts of the zero-cross error detection during a low speed seek;

DESCRIPTION OF THE PREFERRED EMBODIMENTS

Apparatus Configuration

Figure 1B:
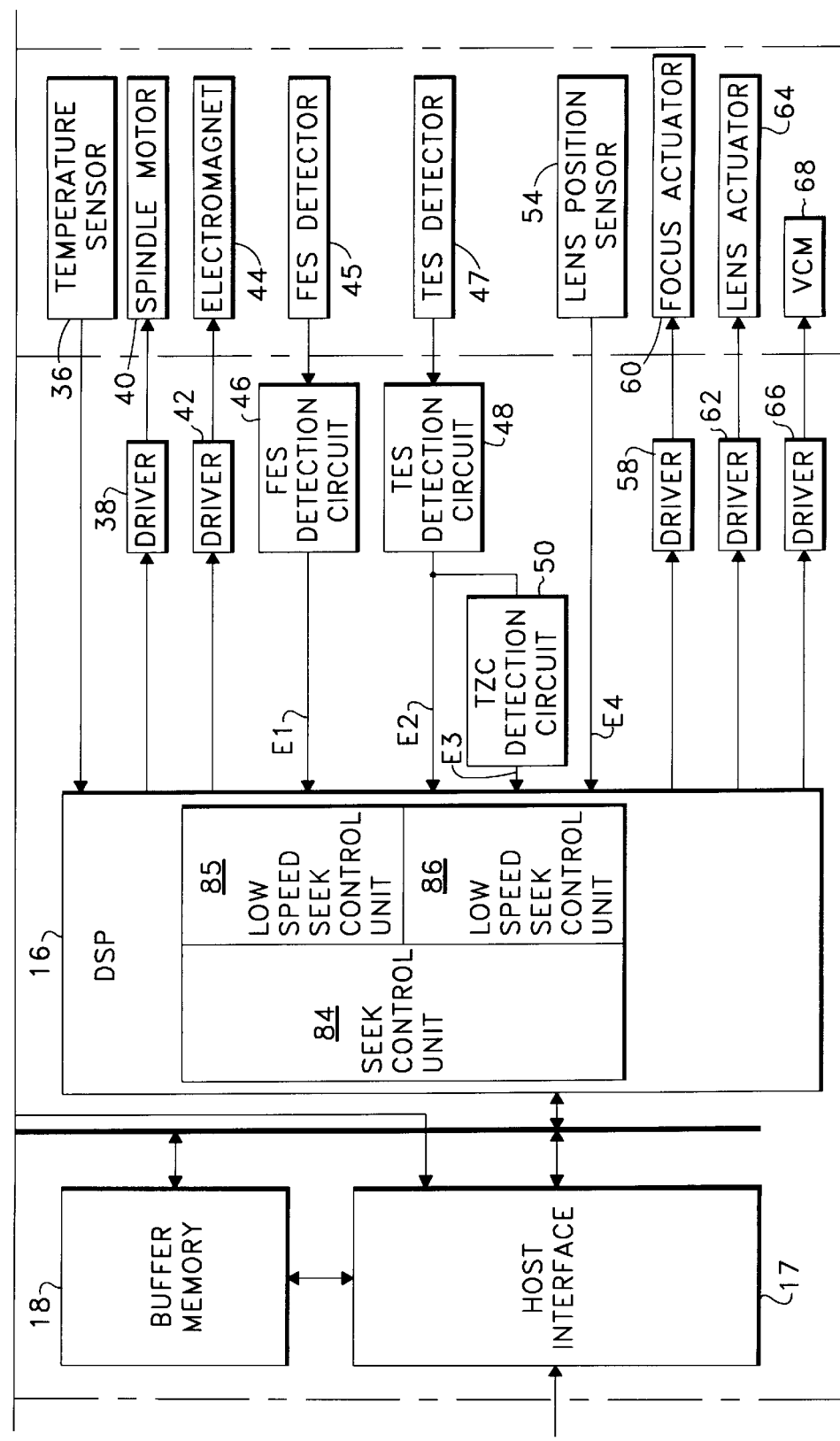

FIGS. 1A and 1B are circuit block diagrams of an optical disk drive which is an optical storage device in accordance with the present invention. The optical disk drive of the present invention comprises a control unit 10 and an enclosure 11. The control unit 10 comprises an MPU 12 for performing a general control of the optical disk drive, a host interface 17 for sending/receiving commands and data to/from a host apparatus, an optical disk controller (ODC) 14 for performing processing necessary to read/write data from/to an optical disk medium, a DSP 16 and a buffer memory 18. The buffer memory 18 is shared by the MPU 12, the optical disk controller 14 and the host interface. The optical disk controller 14 includes a formatter 14-1 and an ECC processing unit 14-2. Upon a write access, the formatter 14-1 divides NRZ write data on a medium sector-to-sector basis to generate a record format and the ECC processing unit 14-2 generates an ECC code for each sector write data for adding thereto and if necessary generates a CRC code for adding thereto. The ECC encoded sector data are then converted into e.g., 1–7RLL codes. Upon a read access, the 1–7RLL codes are inversely converted to obtain demodulated sector read data, which in turn are fed to the ECC processing unit for the CRC check and subsequent error detection/correction and then to the formatter 14-1 in which sector-based NRZ data are linked together to obtain an NRZ read data stream to be transferred to the host apparatus. The optical disk controller 14 is associated with a write LSI circuit 20, which includes a write modulation unit 21 and a laser diode control circuit 22. A control output of the laser diode control circuit 22 is fed to a laser diode unit 30 provided in an optical unit on the enclosure 11 side. The laser diode unit 30 integrally includes a laser diode 30-1 and a monitor detector 30-2. The write modulation unit 21 serves to convert write data into PPM recording or PWM recording data formats. In this embodiment, 128 MB, 230 MB, 540 MB or 640 MB MO cartridge medium is available as an optical disk on which record/reproduction is carried out by use of the laser diode unit 30, that is, as a writable MO cartridge medium. Among them, the 128 MB and 230 MB MO cartridge media employ a pit position recording (PPM recording) in which data are recorded in response to the presence or absence of a marking on the media. The medium recording format is a zone CAV having a user area consisting of a single zone for 128-MB medium and of 10 zones for 230-MB medium. The 540-MB and 640-MB MO cartridge media allowing a high-density recording employ a pulse width recording (PWM recording) in which data are correlated with marking edges, that is, a front edge and a rear edge. In this case, the difference in memory capacity between the 640-MB and 540-MB media arises from the difference in sector capacity, so that 2048-bite sector capacity results in 640-MB memory capacity and 512-bite sector capacity results in 540-MB memory capacity. The medium recording format is a zone CAV having a user area consisting of 11 zones for 640-MB medium and of 18 zones for 540-MB medium. In this manner, the optical disk drive of the present invention is capable of dealing with the MO cartridge media having the 128-MB, 230-MB, 540-MB or 640-MB memory capacity. Thus, when the optical disk drive is loaded with the MO cartridge medium, it first reads the medium ID section, recognizes the medium type from its pit interval in the MPU 12 and sends the type recognition result to the write LSI circuit 20. Sector write data from the optical disk controller 14 is converted through the write modulation unit 21 into PPM recording data in case of the 128-MB or 230-MB medium but into PWM recording data in case of 540-MB or 640-MB medium. Then, the PPM recording data or PWM recording data obtained as a result of conversion in the write modulation unit 21 are fed to the laser diode control unit 22 and written to the medium by a light emitting drive of the laser diode 30-1. A read LSI circuit 24 is provided as a read system for the optical disk drive 14 and includes a read demodulation unit 25 and a frequency synthesizer 26. The read LSI circuit 24 receives as an ID signal or an MO signal, through a head amplifier 34, a light detection signal of a beam return light from the laser diode 30-1 by an ID/MO detector 32 provided in the enclosure 11. The read demodulation unit 25 of the read LSI circuit 24 has functions of circuits such as an AGC circuit, a filter and a sector marking detection circuit. The read demodulation unit 25 generates a read clock and read data from the input ID signal and MO signal and demodulates the PPM recording data or the PWM recording data into original NRZ data. Due to the fact that the zone CAV is employed as the control of the spindle motor 40, the MPU 12 performs a controllable setting of a frequency dividing ratio for the generation of a zone-corresponding clock frequency, for the frequency synthesizer 26 incorporated in the read LSI circuit 24. The frequency synthesizer 26 is a PLL circuit provided with a programmable frequency divider and generates as a read clock a reference clock having a specific frequency previously defined in response to a medium zone position. In other words, the programmable frequency divider 26 is comprised of a PLL circuit with programmable frequency divider and generates a reference clock having a frequency of in accordance with a frequency dividing ratio (m/n) which has been set in response to the zone number by the MPU, based on $$of=(m/n) \cdot if$$

where a frequency dividing value n of the denominator of the frequency dividing ratio (m/n) is a value intrinsic to the medium type such as the 230-MB, 540-MB or 640-MB medium, with a frequency dividing value of the numerator being a value which varies depending on the medium zone position and is previously prepared for each medium in the form of table information of values corresponding to zone numbers. Read data demodulated by the read LSI circuit 24 are fed to the optical disk controller 14, in which after the 1–7RLL code inverse conversion, the demodulated read data are subjected to the CRD check and the ECC processing by the encode function of the ECC processing unit 14-2 to restore the NRZ sector data and then are linked to the NRZ read data stream by the formatter 14-1. The resultant data are thereafter transferred through the buffer memory 18 to the host interface 17 and further to the host apparatus.

The MPU 12 receives through the DSP 16 a detection signal of a temperature sensor 36 provided in the enclosure 11. On the basis of the environment temperature within the apparatus which has been detected by the temperature sensor 36, the MPU 12 controls to their respective optimum values the read, write and erase light emitting powers in the laser diode control unit 22. Through the DSP 16 and a driver 38, the MPU 12 controls a spindle motor 40 provided in the enclosure 11. Since the recording format of the MO cartridge is the zone CAV, the spindle motor is rotated at a fixed speed of, for example, 3000 rpm. Through the DSP 16 and a driver 42, the MPU 12 also controls an electromagnet 44 provided in the enclosure 11. The electromagnet 44 is arranged on the side opposite to the beam irradiation side of the MO cartridge loaded in the apparatus, to apply an external magnetic field to the medium at the time of recording and erasing operations. The DSP 16 has a servo function for positioning on the medium a beam from the laser diode 30 and includes a seek control unit 84 for seeking at a target track for on-track. The seek control unit 84 consists of a low speed seek control unit 85 and a high speed seek control unit 86 and allows a simultaneous execution in parallel with a write access or a read access in response to an upper command by the MPU 12. In order to implement the servo function of the DSP 16, the optical unit on the enclosure 11 side includes an FES detector 45 for detecting a beam return light from the medium. An FES detection circuit (a focus error signal detection circuit) 46 generates a focus error signal E1 from a detection output of the FES detector 45 and sends it to the DSP 16. The optical unit on the enclosure 11 side also includes an TES detector 45 for detecting a beam return light from the medium. An TES detection circuit (a tracking error signal detection circuit) 46 generates a tracking error signal E2 from a detection output of the TES detector 47 and sends it to the DSP 16. The tracking error signal E2 is provided as input to a TZC detection circuit (a track zero-cross detection circuit) 50, which generates a track zero-cross pulse E3 and sends it to the DSP 16. The enclosure 11 further includes a lens position sensor 54 for detecting a lens position of an objective lens through which a laser beam is applied to the medium. The lens position sensor 54 generates a lens position detection signal (LPOS) E4 and sends it to the DSP 16. In order to control abeam spot position on the medium, the DSP controllably drives a focus actuator 60, a lens actuator 64 and a VCM 68 by way of drivers 58, 62 and 66, respectively.

Figure 2:
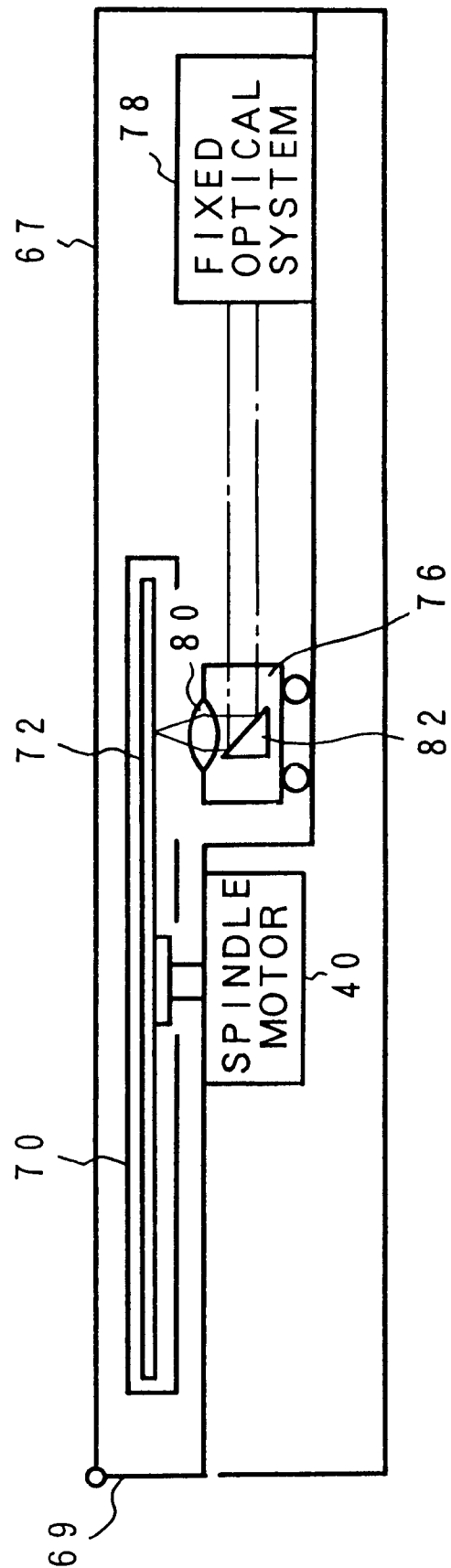
FIG. 2 is an explanatory diagram of an internal structure of the disk drive loaded with an MO cartridge.

FIG. 2 illustrates a schematic configuration of the enclosure 11 in the optical disk drive. The spindle motor 40 is accommodated in a housing 67 and has a rotary shaft hub onto which an MO cartridge 70 is loaded through an inlet door 69 so that an MO medium 72 inside the cartridge 70 is fitted on the rotary shaft hub of the spindle motor 40. Under the thus loaded MO cartridge 70 containing the MO medium 72 is disposed a carriage 76 which can be freely moved in the direction across medium tracks by means of the VCM 68. On the carriage 76 is mounted an objective lens 80 which receives through a prism 82 a beam from a laser diode provided in a fixed optical system 78 and forms a beam spot on a medium surface of the MO medium 72. The objective lens 80 is so controlled as to be movable in the optical axial direction by the focus actuator 60 provided in the enclosure 11 of FIGS. 1A and 1B and is allowed to move by the lens actuator 64 in the radial direction across the medium tracks by a distance within, e.g., several tens of tracks. The lens position sensor 54 detects a position of the objective lens 80 mounted on the carriage 76. The lens position sensor 54 sets a lens position detection signal to zero at a neutral position at which the optical axis of the objective lens 80 is directed vertically upward and issues a lens position detection signal E4 of different polarities response to the amount of movement to the outer side or inner side.

Figure 3A:
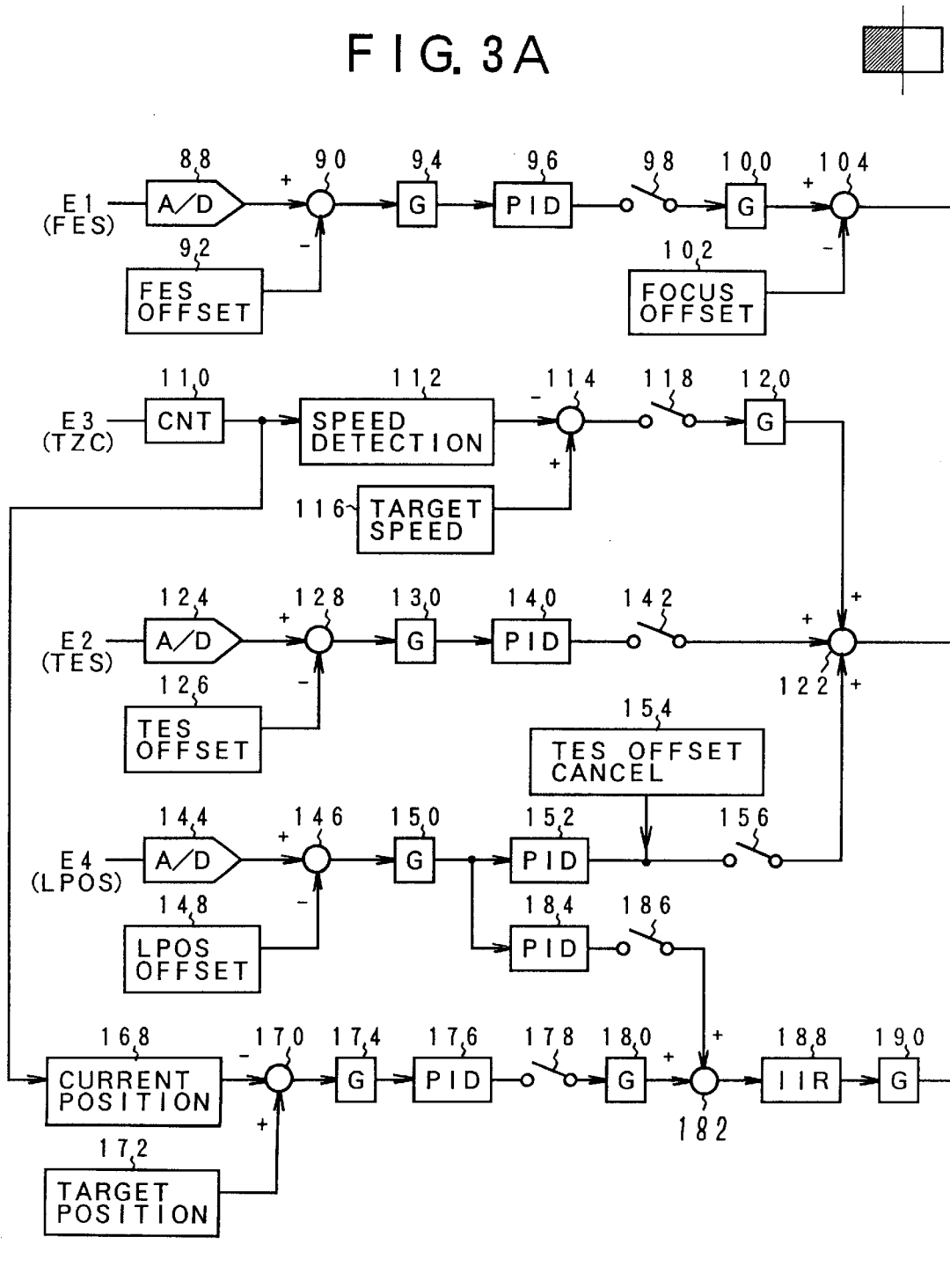
FIG. 3A and 3B are functional block diagrams of a servo system implemented by a DSP of FIGS. 1A and 1B.
Figure 3B:
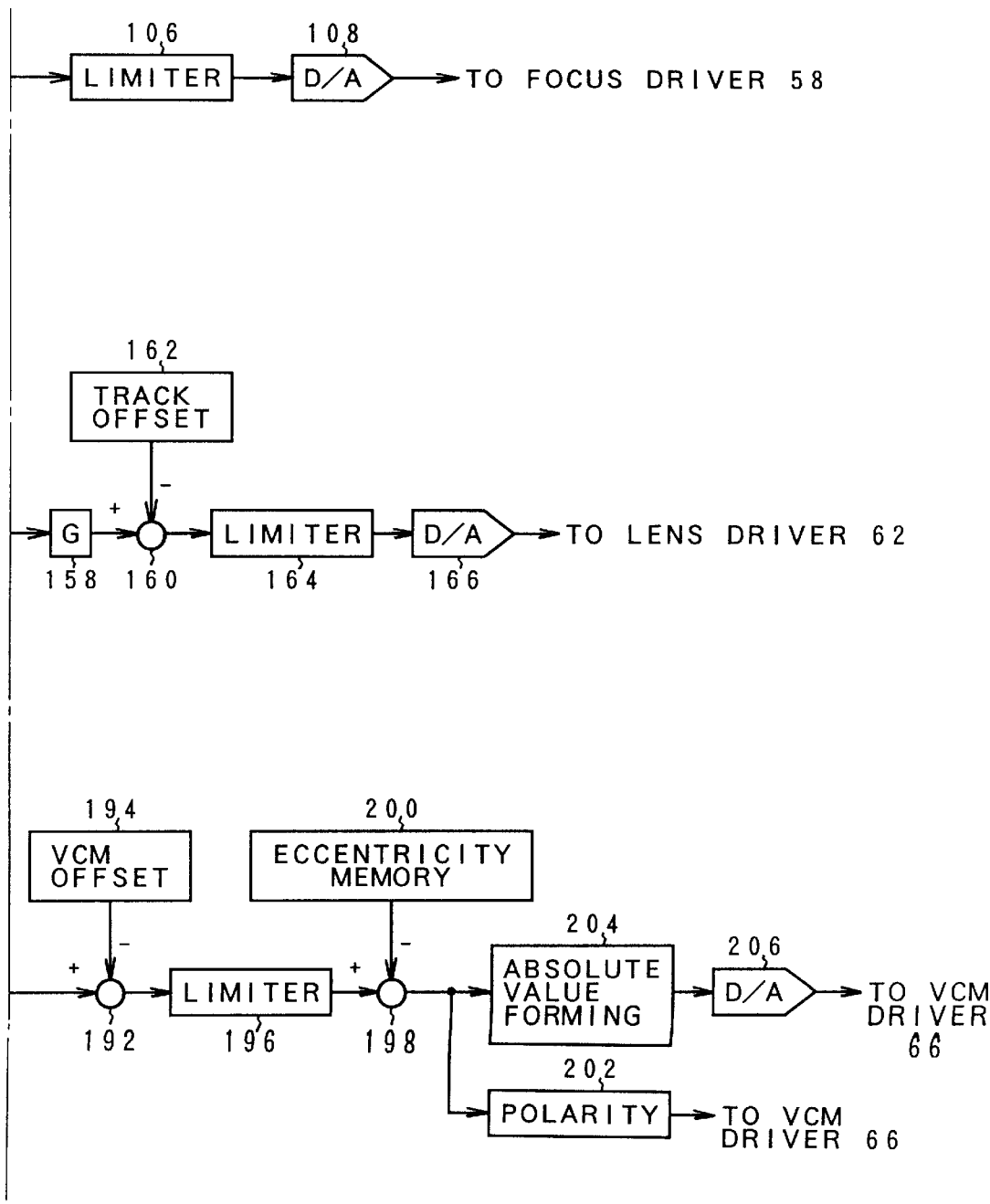

FIGS. 3A and 3B are functional block diagrams of the focus servo, lens servo and VCM servo which are implemented by the DSP 16 provided in the control unit 10 of FIGS. 1A and 1B. First, in the focus servo system, the focus error signal E1 is converted into digital data through an AD converter 88 and fetched therein, the data being corrected at an addition point 90 by use of an FES offset which has been set in a register 92, and then fed to a phase compensator 94 in which the corrected data undergo a phase compensation for raising a gain with respect to a predetermined high frequency band, and further to a PID operation unit 96 in which the focus error signal is subjected to proportional integral and differential operations. The resultant signal is phase compensated by a phase compensator 100 and then corrected at an addition point 104 by using a focus offset of a register 102. The output signal of the addition point 104 is further fed through a limiter 106 to a DA converter 108 for the conversion into an analog signal, which in turn is provided as a current instruction value through the driver 58 to the focus actuator 66. A servo switch 98 is disposed between the PID operation unit 96 and the phase compensator 100 so as to enable the on/off action of the focus servo to be controlled.

Description will then be made of a lens servo system for the lens actuator 64, which acts as a leading element for a low speed seek control. The lens servo system includes three systems, that is, a speed control system, a tracking servo system and a lens position servo system. Firstly, in the speed control system, the track zero-cross signal E3 is fed to a track counter 110 for obtaining a track zero-cross interval by clock counting and further to a speed detector 112 for obtaining a beam speed. The output of the speed detector 112 is imparted to an addition point 114 in which is obtained an error relative to a target speed derived from a register 116. The output of the addition point 114 is fed through a servo switch 118 to a phase compensator 120 in which is carried out a phase compensation associated with the speed error and thereafter fed to an adder 122. Secondly, in the tracking servo system, the tracking error signal E2 is converted into digital data through an AD converter 124 and fetched therein, the data being corrected at an addition point 128 by use of a TES offset which has been set in a register 126, and then fed to a phase compensator 130 to undergo a phase compensation, and further to a PID operation unit 140 for proportional integral and differential operations. The resultant signal is fed via a servo switch 142 to the adder 122. Thirdly, in the lens position servo system, the lens position detection signal E4 is converted into digital data through an AD converter 144 and fetched therein, the data being corrected at an addition point 146 by use of an LPOS offset which has been set in a register 148, and then fed to a phase compensator 150 to undergo a phase compensation, and further to a PID operation unit 152 for proportional integral and differential operations. The resultant signal is further fed via a servo switch 156 to the adder 122. ATES offset cancel may be applied by a register 154 to the input side of the servo switch 156. The speed error signal of the speed control system, the tracking error signal of the tracking servo system and the lens position error signal of the tracking servo system are added together at the adder 122, phase compensated by a phase compensator 158, subjected to a track offset correction by the register 162 at an addition point 160 and converted through a DA converter 166 into an analog signal, which in turn is provided as a current instruction value through the driver 62 to the lens actuator 64.

Description will then be made of a servo system for the VCM 68, which acts as a leading element for a high speed seek control. The servo system of the VCM 68 comprises a feedforward controlled servo system on the basis of an error between a target track position and a current track position at the time of seek. First, an adder 170 compares a current position by a register 168 of a beam detected by the counter 110 based on the track zero-cross signal E3, with a target track position of a register 172 to generate a position error signal corresponding to the number of remaining tracks relative to the target track position. An output of the adder 170 is phase compensated by a phase compensator 174 and is subjected to a proportional integral and differential operation by a PID operation unit 176, whose output is further fed through a servo switch 178 to a phase compensator 180 for phase compensation and then through an adder 182 to an IIR 188. The resultant output is further phase compensated by a phase compensator 190 and is corrected by an adder 192 using a VCM offset set in a register 194, whose output is further fed through a limiter 196 to an adder 198. The adder 198 performs a medium eccentricity correction by reading out data from an eccentricity memory 200. A register 202 imparts different polarities depending on the direction of seek, that is, on the inner direction or outer direction, to the VCM servo position error signal subjected to the eccentricity correction by the adder 198. The resultant signal is then fed to an absolute value forming circuit 204 to obtain its absolute value and then to a DA converter for the conversion into an analog signal, which in turn is provided as a VCM current instruction value via the driver 66 to the VCM 68. The adder 182 of the VCM servo system further receives, via a PID operation unit 184 and a servo switch 186, a branch output of the phase compensator 150 of the lens position servo system provided in the lens servo system. Thus, when a lens seek is performed by driving the objective lens through the lens actuator with the servo switch 186 closed, a lens position error signal generated by the adder 146 on the basis of a lens position detection signal at that time is fed as a position error signal via the PID operation unit 184 and the servo switch 186 to the adder 182 of the VCM position servo system. For this reason, the VCM 68 serves to control the position of the carriage so as to nullify the lens position offset through the drive of the lens actuator 64. This is therefore called a double servo since such a servo control based on an error signal derived from a lens position detection signal by the lens actuator is added to the VCM 68 servo system.

Figure 6:
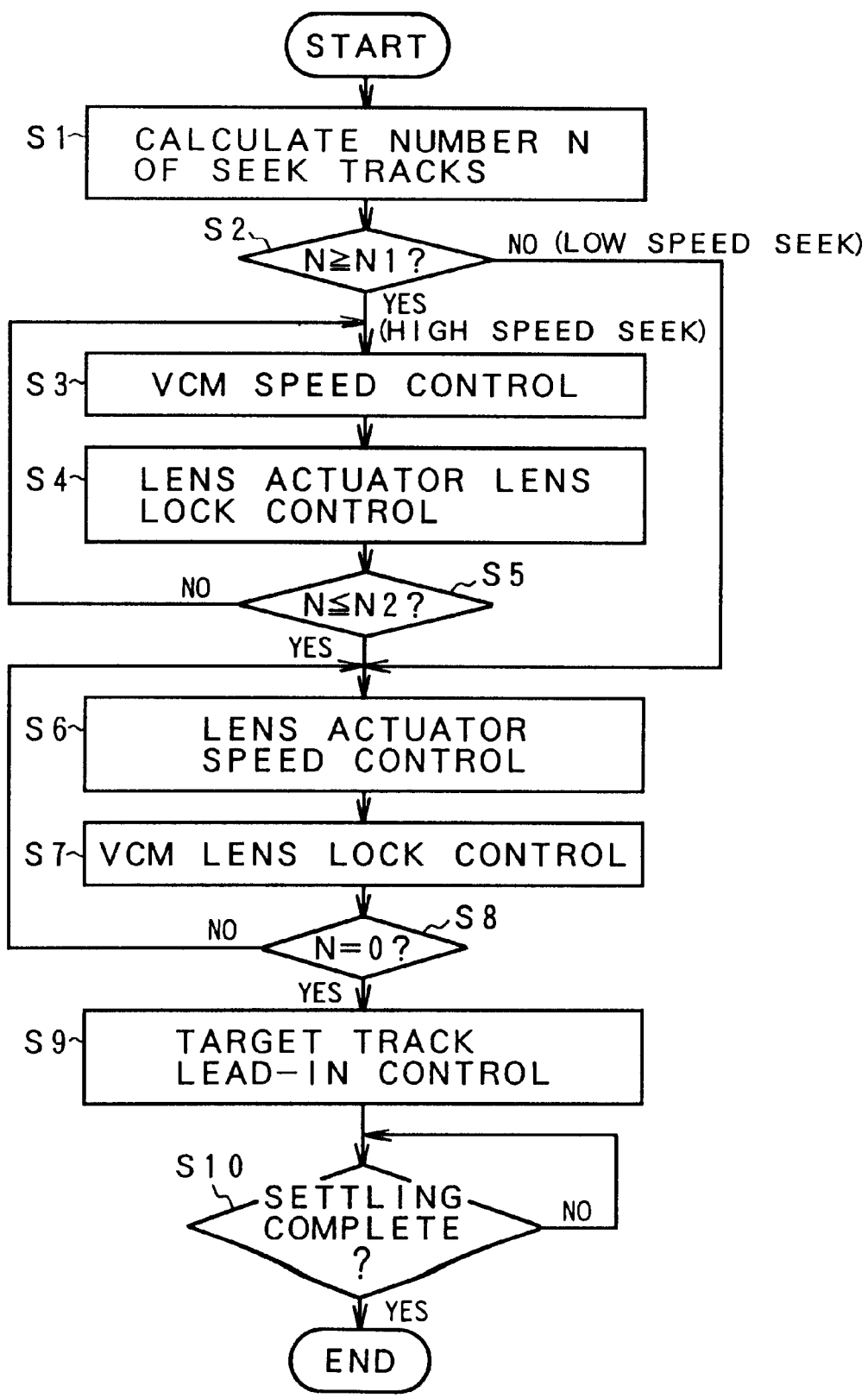
FIG. 6 is a flow chart of a seek control executed by a seek control unit of FIGS. 1A and 1B.

FIG. 4 illustrates a control mode and on/off states of the servo switches 98, 118, 142, 156, 178 and 186 in the servo system of FIGS. 3A and 3B. The control mode of the servo system includes five modes, that is, a focus off mode, a track off mode, a track on mode, a fine seek mode and a position seek mode. The contents of control in the modes are as shown in FIG. 6. First, the focus off mode provides a state of beam track access stop, in which the focus servo is deactivated by opening the servo switch 98, with only the servo switch 156 closed, so that the objective lens on the carriage is controlled to move to its zero position by means of the lens actuator 64. The track off mode provides a control in which the focus servo is activated by closing the servo switch 98, with the servo switch 156 closed, so that the objective lens is brought to its zero position by the lens actuator 64. Thus, the track off mode permits only focusing of the beam onto the medium in the beam stop state. The track on mode provides an on-track control through the drive of the lens actuator 64 on the basis of a tracking error signal, by turning on the servo switch 98 to activate the focus servo with the servo switch 142 closed. The servo switch 186 is then closed so that the VCM servo system provides a position servo control on the basis of a lens position detection signal, thereby enabling a VCM offset or an eccentricity offset to be compensated. The fine seek mode provides a control for moving the beam to a target position through the speed control of the lens actuator 64 and the feedforward control of the VCM 68, in response to a target cylinder access instruction issued from the host apparatus. That is, with the focus servo activated as a result of closing the servo switch 98, the servo switch 118 is turned on to perform the speed control of the lens actuator 64. The servo switch 178 is then turned on so that the feedforward control is carried out which responds to an error of a current track position relative to the target track position. The servo switch 186 is then turned on so that a double servo control is provided which controls a movement of the beam to the lens zero position by the drive of the VCM 68 on the basis of a position error of the lens position signal E4. The position seek mode provides a lens position control by the lens actuator 64, in which with the lens retained at its zero position, the positional control is carried out by means of the VCM 68 so that the beam is moved to a target track on the basis of a position error signal corresponding to the number of tracks at the current track position relative to the target track position. That is, with the focus servo activated as a result of closing the servo switch 96, the servo switch 156 is turned on, allowing the lens actuator 64 to perform a lens lock operation for retaining the lens at its zero position. In this state, the servo switch 178 is turned on to allow the VCM 68 to move the carriage so as to nullify the error relative to the target track position so that the beam is controlled to move to the target track position.

Seek Control

FIG. 6 is a schematic flowchart of seek control executed by the seek control unit 84 provided in the DSP 16 of FIGS. 1A and 1B. First, in step S1, upon a reception of a seek command from the host apparatus, there is calculated the number N of seek tracks (remaining tracks) to be crossed to access a target track, from a difference between the target track number and a current track number. Then, in step S2, the number N of seek tracks is compared with a previously defined specific value N1, and if N is equal or greater than the specific value N1, then sequence goes to step S3 in which a high speed seek control is performed through the VCM speed control. The high speed seek control is effected by controlling the speed of the VCM 64 on the basis of a speed error between a target speed and a measured speed in step S3. Simultaneously, in step S4, the lens actuator 64 is subjected to a lens lock control. In step S5, a check is made to see if the number N of seek tracks during the high speed seek has reached a predetermined value N2. When the predetermined value N2 has been reached, sequence goes to step S6 in which control is switched to a low speed seek control through the speed control of the lens actuator 64. During the low speed seek control, the lens lock control by the VCM 64 is simultaneously performed in step S7. When the number N of seek tracks results in zero and the target track has been reached in step S8 during the low speed seek control, sequence goes to step S9 in which a control is carried out to lead-in a beam onto the target track. After the beam lead-in control, settling is checked in step S10 of whether the tracking error signal lies within a specific range around zero, and if settling has been achieved, a series of seek control is completed. After the completion of the seek control, the writing or reading operation is ready, allowing data to be written onto or read from a target track. On the other hand, the number N of seek tracks to be crossed to reach the target track is less than the specific value N1 in step S1, then sequence goes to step S6 for low speed seek control. This low speed seek control is the same as the low speed seek control performed when the predetermined value N2 has been reached during the high speed seek control. In this instance, the low speed seek control unit 85 in the DSP 16 of FIGS. 1A and 1B has a sampling frequency of 68 kHz and provides a control at the time of low speed seek by obtaining a beam speed at a track zero cross interval, that is, at each one track elapsed time. In contrast with this, the high speed seek control unit 86 has a sampling frequency of 17 kHz and provides a control by obtaining from the track counter 110 a distance through which a beam of light advances for each sample.

FIGS. 7A to 7E are time charts at the time of low speed seek control executed by the low speed seek control unit 85 of FIGS. 1A and 1B. In the low speed seek control, the beam speed as shown in FIG. 7A is subjected to an acceleration control after the seek activation at time T1, reaches a certain target speed at time T2 to thereafter keep a constant speed control, undergoes a shift to a deceleration control at time 3 before reaching the predetermined number of tracks to be crossed to reach the target track. A track lead-in control is performed at time T4 at which the target track has been reached. In contrast with such a variation in beam speed of FIG. 7A, the tracking error signal E2 varies as shown in FIG. 7B. The tracking error signal E2 has an unvarying frequency during the constant speed control from time T2 to time T3. The lens lock mode of FIG. 7E to turn on/off the lens lock control goes on in response to the seek activation at time T1 to provide the lens lock control for the VCM on the basis of a lens position signal. FIG. 7C illustrates a current Ia fed to the lens actuator 64 to obtain a beam speed profile of FIG. 7A. During the beam acceleration period from time T1 to T2, in the case of, e.g., the outer seek, the current Ia fed to the lens actuator 64 has a smooth current profile along which the current increases stepwise in the positive direction but decreases stepwise as approaching the constant speed control. Similarly, the deceleration current after time T3 has also a stepwise varying profile, ensuring a smooth deceleration. FIG. 7D illustrates a current Iv fed to the VCM 68 to perform a lens lock in synchronism with the current Ia fed to the lens actuator 64. As a result of this, the drive of the carriage by the VCM 68 provides a lens lock control for the movement of the lens actuator during the low speed seek, presenting a lens lock state in which the optical axis offset of the objective lens is constantly kept at zero. Furthermore, in the low speed seek control, as shown in FIG. 7E, the seek mode is turned on in response to the seek activation at time T1 and turned off in response to the lead-in control at time T4 at which the target track has been reached.

FIGS. 8A to 8E are time charts of the high speed seek control executed by the high speed seek control unit 86 provided in the DSP 16 of FIGS. 1A and 1B. In the high speed seek control, as shown in FIG. 8A, the beam speed is accelerated by the drive of the VCM at time T1, reaches a specific constant high speed at time T2 and is decelerated by the VCM at time T3 at which the number of tracks to be crossed to reach the target track becomes equal to the specific number of tracks which is a standard of a shift to the low speed seek control, and undergo a shift to the low speed seek control at time T4. That is, as illustrated in the control mode of FIG. 8E, the high speed seek mode continues from time T1 to time T4, and thereafter the low speed seek mode appears. The low speed seek mode after time T4 is substantially the same as the low speed seek control of FIGS. 7A to 7E except that the former immediately enters the constant speed control without any need for the acceleration period. Then, the deceleration of the low speed seek control is initiated at time T3, predetermined number of tracks short of the target track. When the target track is reached at time T7, the lead-in control is executed, and the settling is completed at time T8. In contrast with such a beam speed in the high speed seek mode of FIG. 8A, the tracking error signal E2 acts as shown in FIG. 8B. That is, although it has a high frequency of several tens of kHz during the high speed seek, a halfway shift to the low speed seek control brings about a change into a low frequency below 10 kHz. During the high speed seek from time T1 to time T4, a current Iv is fed to the VCM as shown in FIG. 8D to perform the speed control. In the acceleration period, the VCM current Iv is also increased and decreased stepwise to achieve a smooth acceleration of the carriage. Similarly, in the deceleration period from time T3 to T4, the current is increased and decreased stepwise in one direction to ensure a smooth deceleration of the carriage. At the same time, a lens actuator current Ia is fed to the lens actuator 68 in synchronism with the acceleration of the carriage by the VCM 64 to thereby drive the lens actuator so as to overcome an inertial force attendant on the activation of the carriage, thus performing a lens lock for retaining the objective lens at an optical axis offset free position. The same applies to the VCM deceleration from time T3 to T4. That is, in order to prevent the lens actuator 64 mounted on the carriage from being excessively displaced by its inertial force arising from the deceleration of the carriage, the current Ia is fed to the lens actuator 64 to thereby keep the objective lens the optical axis offset free. During the constant speed control from time T2 to T3, the tracking error signal E2 is allowed to have substantially a constant frequency of, e.g., several tens of kHz and a lens lock is performed through the position control of the lens actuator 64 so as to nullify the lens position signal E4. The low speed seek mode after time T4 is substantially the same as the case of the low speed seek control after time T2 of FIGS. 7A to 7F.

Low Speed Seek Control and Zero-cross Error Detection

Figure 9A:
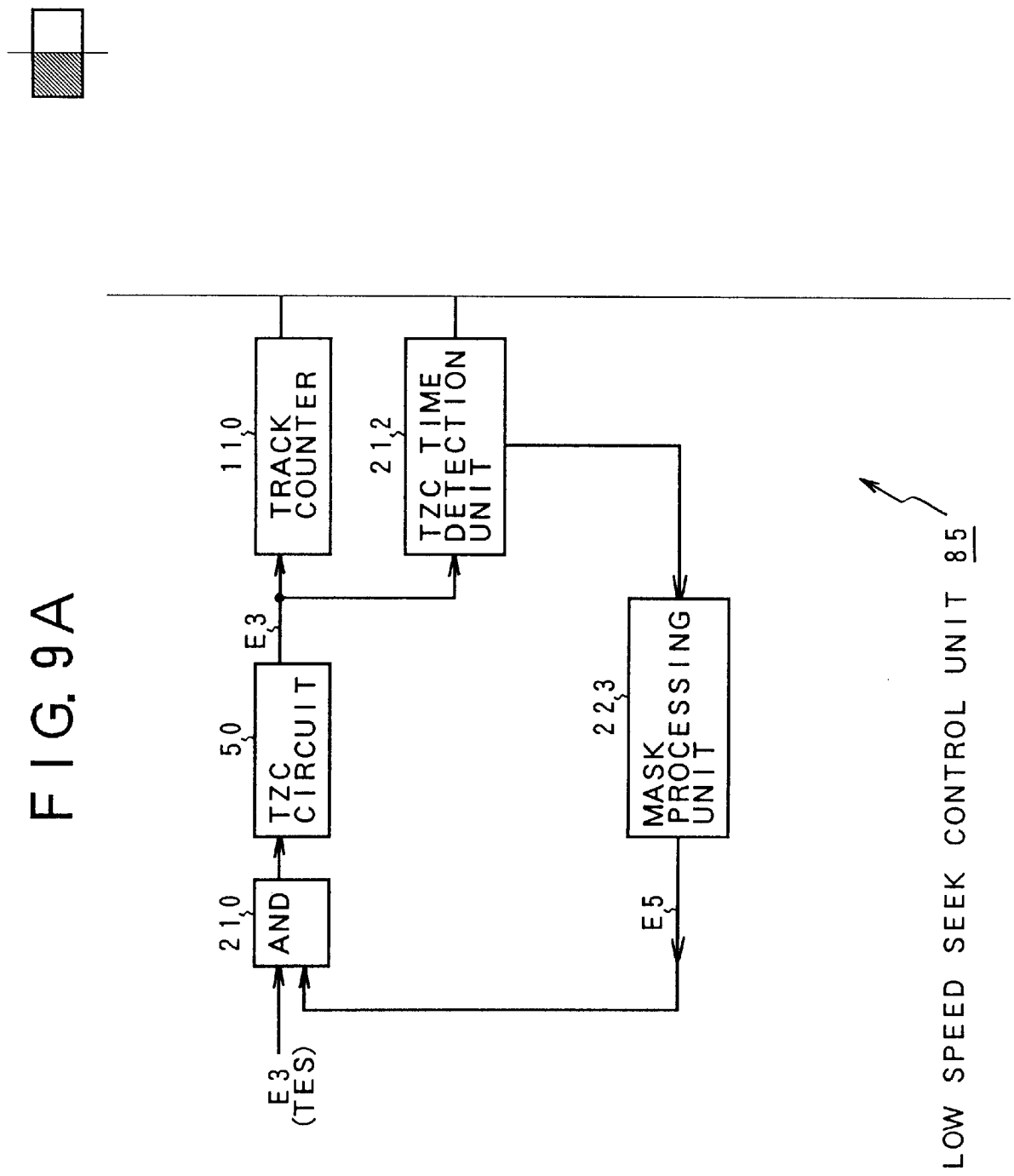
FIGS. 9A and 9B are functional block diagrams of a low speed seek control unit of the present invention for judging and processing a zero-cross error detection.
Figure 9B:
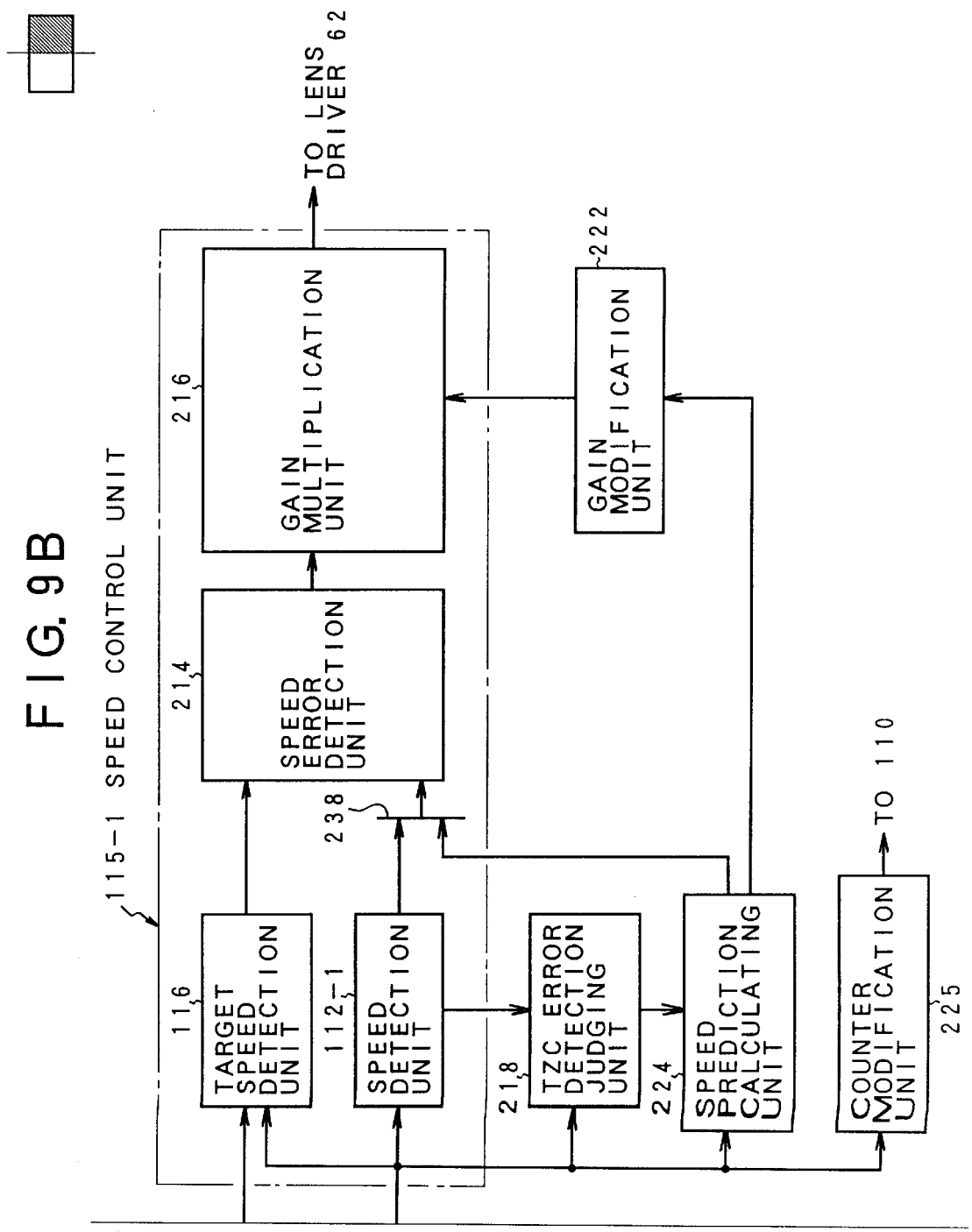

FIGS. 9A and 9B are functional block diagram of the low speed seek control unit provided in the DSP 16 of FIGS. 1A and 1B. The low speed seek control unit 85 includes the track counter 110, which receives through an AND circuit 210 a track zero-cross signal E3 detected by the TZC detection circuit 50 of FIGS. 1A and 1B. Prior to the initiation of the seek, the number of tracks to be crossed to reach a target track is preset into the track counter 110, which counts down on the basis of the track zero-cross signal E3 obtained when the carriage 76 or the lens actuator 82 is sought in the outer direction, to thereby indicate the number of remaining tracks. The track counter 110 is followed by a speed control unit 215-1, which includes a speed detection unit 112-1, a target speed detection unit 116, a speed error detection unit 214 and a gain multiplication unit 216. The speed detection unit 112-1 detects a beam speed each time a track zero-cross signal E3 is obtained. A track zero-cross time detection unit (TZC time detection unit) 212 is provided for this speed detection. The track zero-cross time detection unit 212 starts its time measurement action when a track zero-cross signal E3 is obtained by way of an AND circuit 210, and provides a zero-cross interval time t as its output to the speed detection unit 112-1 when another track zero-cross signal E3 is obtained. These procedures are repeated.

The speed detection unit 112-1 calculates a beam speed V from $$V = Tp/t$$

where t is a track zero-cross time and Tp is a track pitch. The target speed detection unit 116 obtains the number of seek tracks, that is, the number of remaining tracks given as a difference between a current track position and a target track position in the track counter 110, and reads for setting from. e.g., table information a target speed having a speed profile predefined in accordance with the number of remaining tracks. The speed error detection unit 214 subtracts a detection speed V from a target speed Vr to obtain a speed error (Vr−V). The thus obtained speed error is imparted to the gain multiplication unit 216, in which the speed error is multiplied by a gain G predefined in accordance with the control interval equal to one track pitch, to obtain a drive current I. The drive current I is fed to the lens actuator 64. In addition to such a speed control unit 115-1, the low speed seek control unit 85 of the present invention further includes a track zero-cross error detection judging unit (TZC error detection judging unit) 218, a speed prediction calculating unit 224, a gain modification unit 222, a mask processing unit 223 and a counter modification unit 225. The track zero-cross error detection judging unit 218 judges whether a zero-cross error detection has occurred or not, on the basis of a zero-cross interval t being detected by the track zero-cross time detection unit 212. The track error detection judgment includes:

I. Error detection judgment based on the zero-cross interval t;

II. Error detection judgment based on a speed V derived from the zero-cross interval t; or III. Error detection judgment based on an acceleration α derived from the zero-cross interval t.

The zero-cross error detection judgment will then be described specifically with reference to time charts of FIGS. 10A to 10C. FIG. 10A illustrates a tracking error signal E2, which has waveform distortions containing zero-crossing by noises 250 and 252 at two points in the vicinity of the zero-crossing. FIG. 10C illustrates a track zero-cross signal E3 derived from the tracking error signal E3 of FIG. 10A, the track zero-cross signal E3 being inverted each time the tracking error signal E2 is zero crossed. If the tracking error signal E2 is free from any zero-cross error detection, the leading interval of the track zero-cross signal E3 for instance is equal to one track pitch Tp. FIG. 10B illustrates a mask signal E5, which falls from H level down to L level in synchronism with the rise up to H level of the track zero-cross signal E3, and for a predefined certain period of time tm, inhibits the AND circuit 210 of FIG. 9A to thereby interrupt the input of the tracking error signal E2 to the track zero-cross detection circuit 50. Thus, the input of the noise 250 in the tracking error signal E2 to the track zero-cross circuit 50 is interrupted by the mask signal E5, preventing the noise 250 from causing any error detection in the track zero-cross signal E2. The mask time tm of the mask signal E5 can be a period of time not more than 50% of the zero-cross interval at the maximum speed in the low speed seek. By virtue of such a mask signal E5, there is no detection of an error in the track zero-cross signal E3 caused by the noise 250 in the tracking error signal E2. In the case of the noise 252 which has occurred subsequently and has been offset from the L level timing, the track zero-cross signal E3 is subjected to a signal inversion corresponding to the zero crossing by the noise, resulting in a zero-cross error detection 254. In the track pitch immediately before the track pitch which has undergone the zero-cross error detection 254, in this case, a normal zero-cross signal is obtained as seen in the zero-cross interval t0. In the track pitch where the zero-cross error detection 254 has taken place, t1 denotes the length of time which has elapsed by the zero-cross error detection 254 and t2 denotes the length of remaining time. Therefore, (t1+t2) results in the proper zero-cross interval of the track pitch where the zero-cross error detection has occurred halfway. In the low speed seek control unit 85 of FIGS. 9A and 9B, the zero-cross time detection unit 212 detects at a timing of time T0 a zero-cross interval t0 equal to a time taken to pass through one track pitch free from any zero-cross error detection, that is, the track pitch immediately before the track pitch where the track zero-cross signal E3 has undergone the zero-cross error detection 254. As a result, the speed detection unit 112-1 detects a beam speed from $$V0 = Tp/t0 \tag{1}$$

The target speed detection unit 116 sets a target speed Vr from the number of remaining tracks at that time, allowing the lens actuator 64 to receive through the speed error detection unit 214 and the gain multiplication unit 216 a drive current given as $$I = G \cdot (Vr - V0) \tag{2}$$

Then, when the zero-cross error detection 254 has taken place at time T1 of FIG. 10C due to the noise 252 contained in the tracking error signal E2, the track zero-cross time detection unit 212 detects the length of time t1 which has elapsed from time T0 by time T1 at which the zero-cross error detection has occurred, so that the speed detection unit 112-1 calculates a speed V1 based on the zero-cross error detection from $$V1 = Tp/t1 \tag{3}$$

The detection speed V1 is substantially double the detection speed V0 according to the expression (1) since the proper interval (t1+t2) free from any zero-cross error detection has resulted in the length of time t1 which is substantially equal to a half of the proper interval. Therefore, the track zero-cross error detection judging unit 218 judges a zero-cross error detection on the basis of conditions given as $$130\% t0 > t1 > 70\% t0$$

This means that judgment is made of whether the current length of time t1 lies outside a range from 70% to 130% of the interval t0 of the last track pitch where no zero-cross error detection has occurred. Then, if the length of time t1 is less than 70% or more than 130% of the last zero-cross interval t0 free from any zero-cross error detection, it is judged that zero-cross error detection has occurred. Although in this case the track zero-cross error detection judging unit 218 compares the length of time t1 detected by the track zero-cross time detection unit 212 with the past zero-cross interval t0 free from any zero-cross error detection to make a judgment of whether an error detection has occurred or not, the zero-cross error detection may otherwise be judged by speed or acceleration. More specifically, let V1 and V0 be the current detection speed and the last speed free from any error detection, respectively, to give a conditional expression $$130\% V0 > V1 > 70\% V0$$

Then, if the detection speed V1 is less than 70%V0 or more than 130%V0, it is judged that a zero-cross error detection has occurred. In the same manner, the current acceleration α 1 and the last acceleration α1 free from any zero-cross error detection are obtained to give a conditional expression $$130\% \alpha\, 0 > \alpha\, 1 > 70\% \alpha\, 0$$

Then, if the current acceleration α 1 is less than 70 α 0 or more than 130 α 0, it is judged that a zero-cross error detection has occurred. Although 70% and 130% are employed by way of example as the lower and upper limits, respectively, which are threshold values of the conditional expressions for judging whether a zero-cross error detection has occurred or not, it is natural that other values may be appropriately defined if necessary.

Reference is again made to FIGS. 9A and 9B. When it is judged in the track zero-cross error detection judging unit 218 that a track zero-cross error detection has occurred, the speed prediction calculating unit 224 performs a calculation for predicting a correct speed which would be obtained if any zero-cross error detection has not occurred. The speed predicting calculation will then be described with reference to the time charts of FIGS. 10A to 10C. In response to the zero-cross error detection 254 at time T1, the speed detection unit 112-1 detects an erroneous speed V1 from the expression (1). Then, the speed prediction calculating unit 224 calculates a proper speed V1p as follows using the detection speed V1 having an erroneous value in response to the zero-cross error detection.

$$V1p = V1(t1/t0) \tag{4}$$

That is, there is not so large a variation in speed between the track pitch subjected to the zero-cross error detection 254 and the adjacent track pitch free from any zero-cross error detection, so that the track pitch containing the zero-cross error detection 254 is considered to have substantially the same interval as the zero-cross interval t0 in the last track pitch free from any zero-cross error detection. Then, in order to predict the proper speed V1p, the erroneous detection speed V1 calculated from the expression (3) in response to the track zero-cross error detection is multiplied by a time ratio (t1/t0), which is obtained by dividing the length of time t1 which has elapsed by the zero-cross error detection by the proper zero-cross interval t0. Furthermore, to enhance the accuracy of the prediction speed V1p, the speed prediction calculating unit may obtain the prediction speed V1p from $$V1p = V1 \cdot (t1/t0) + 9.8 \cdot A \cdot I \cdot ts \tag{5}$$

where I denotes a current [ampere] fed to the lens actuator 64 at the control timing T0 and A denotes an acceleration ability [G/ampere] of the lens actuator 64. In place of the erroneous detection speed V1 detected by the speed detection unit 112-1, the prediction speed V1p of the expression (4) or (5) calculated by the speed prediction calculating unit 224 is imparted via a selector 238 to the speed error detection unit 214 in which a speed error (Vr−V1p) is obtained and further to the gain multiplication unit 216. The gain G by which the speed error is multiplied in the gain multiplication unit 216 at that time is modified upon the zero-cross error detection by the gain modification unit 222. The gain modification unit 222 modifies the gain G on the basis of the time ratio (t1/t0) of the length of time t1 which has elapsed by the zero-cross error detection 254 to the last zero-cross interval t0 free from any zero-cross error detection 254 of FIG. 10C. That is, the modified gain Ga is given as $$Ga = G \cdot (t1/t0) \quad (6)$$

This modification of the gain G is performed on the assumption that a track zero-crossing is detected in every track pitch Tp in the current control for the lens actuator 64 executed by the low speed seek control unit 85 of FIGS. 9A and 9B, thereby allowing a drive current to be fed throughout a control segment equal to one track pitch, to impart thereto a power for the speed control. However, in case the zero-cross error detection 254 has occurred halfway in one track pitch as in FIG. 10C, the lens actuator 64 is driven by a current at a timing of this halfway time T1, so that it is impossible to use intactly the gain G which has been set on the assumption that the drive current is fed throughout one track pitch Tp. The gain G for one track pitch is therefore multiplied by the time ratio (t1/t0) to be modified into a smaller value. The gain G may be modified using the expression (6) or may be approximated by $$Ga = G \cdot (t0 - t1)/t0$$

Alternatively, the modification may be made with the time ratio fixed at a predetermined constant, e.g., at 0.5. As a result of this, the drive current I to be finally fed to the lens actuator 64 at the time of the zero-cross error detection is expressed as follows.

$$\begin{aligned} I &= Ga(Vr - V1p) \quad (7) \\ &= G(t1/t0)\{Vr - (Tp/t1)(t1/t0)\} \\ &= G\{(T1/t0) Vr - (Tp/t1)(t1/t0)(t1/t0)\} \\ &= G\{(T1/t0) Vr - (Tp/t0)(t1/t0)\} \end{aligned}$$

When the expression (7) is correlated with the expression (2), the second term on the right side represents a proper speed, and hence the predicted proper speed V1p can be represented as $$V1p = (Tp/t0)(t1/t0) \quad (8)$$

That is, the expression (8) provides a proper prediction speed V1p at the time of the zero-cross error detection including the modified gain Ga of the expression (6).

Figure 11:
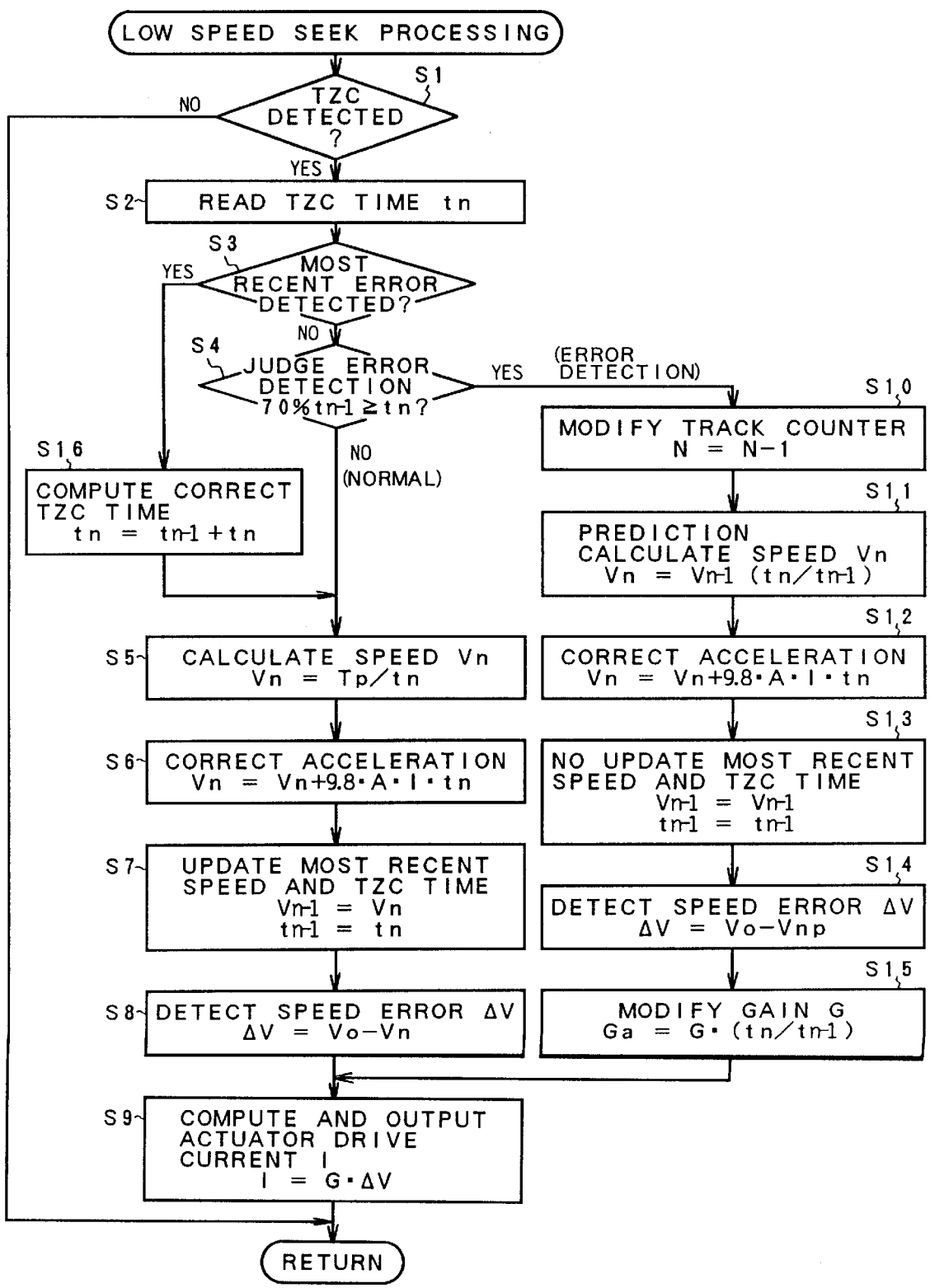
FIG. 11 is a flow chart of the zero-cross error detection and corresponding processing by the low speed seek control unit of FIGS. 9A and 9B.

FIG. 11 is a flow chart of processing corresponding to the zero-cross error detection executed when a proper speed is predicted in accordance with the expression (5) in the low speed seek processing unit of FIGS. 9A and 9B. First, in step S1, it is checked whether a track zero-crossing has occurred or not. If a track zero-crossing is detected, sequence goes to step S2 in which a zero-cross interval tn at that time is read. Subsequently, it is checked in step S3 whether last time a zero-cross error detection has occurred or not, and if not, sequence goes to step S4 in which the current track zero-cross interval tn is compared with, e.g., a 70% value of the last zero-cross interval tn−1 free from any zero-cross error detection. If the current interval tn exceeds the 70% value of the last interval tn−1, then it is judged that no zero-cross error detection has taken place and sequence goes to step S5 in which the speed Vn is calculated, and then to step S6 in which an acceleration correction is performed. Afterwards, in step S7, the last speed and the track zero-cross interval undergo a substitution for updating. Then, in step S8, a speed error ΔV is calculated and thereafter in step S9 the speed error ΔV is multiplied by the gain G to obtain a drive current for the lens actuator 64, which in turn is provided as its output to the lens actuator 64. On the contrary, if in step S4 the current zero-cross interval tn is not more than a 70% value of the last zero-cross interval tn−1, then it is judged that a zero-cross error detection has occurred and sequence goes to step S13. In step S13, the counter modification unit 225 of FIG. 9B carries out a counter modification by way of which the track counter 110 counting up in response to the detection of an error is caused to have the last value. Subsequently, in step S11 a prediction speed Vnp is calculated and then in step S12 an acceleration correction is carried out. Then in step S13, as a result of zero-cross error detection, the last speed and track zero-cross interval are kept as they are without being updated. Afterward, in step S14 a speed error ΔV is acquired by using the prediction speed Vnp and in step S15 a modified gain Ga is obtained through the modification of the gain G. Thereafter, in step S9 the modified gain Ga is multiplied by the speed error ΔV derived from the prediction speed to thereby obtain the actuator drive current I, allowing the drive current being fed to the lens actuator 64. Furthermore, in the case of the next zero-cross detection at time T2 of FIG. 10C following the track zero-cross error detection, it is judged in step S3 that the last zero-cross error detection has occurred, and sequence goes to step S16 in which a proper zero-cross interval Tn is obtained as Tn=Tn+1+Tn, that is, as the sum (T1+T2) of the length of time T1 and T2 before and after the zero-cross error detection of FIG. 10C and is used as a track zero-cross interval for the execution of the processing of steps S5 to S9.

Figure 12:
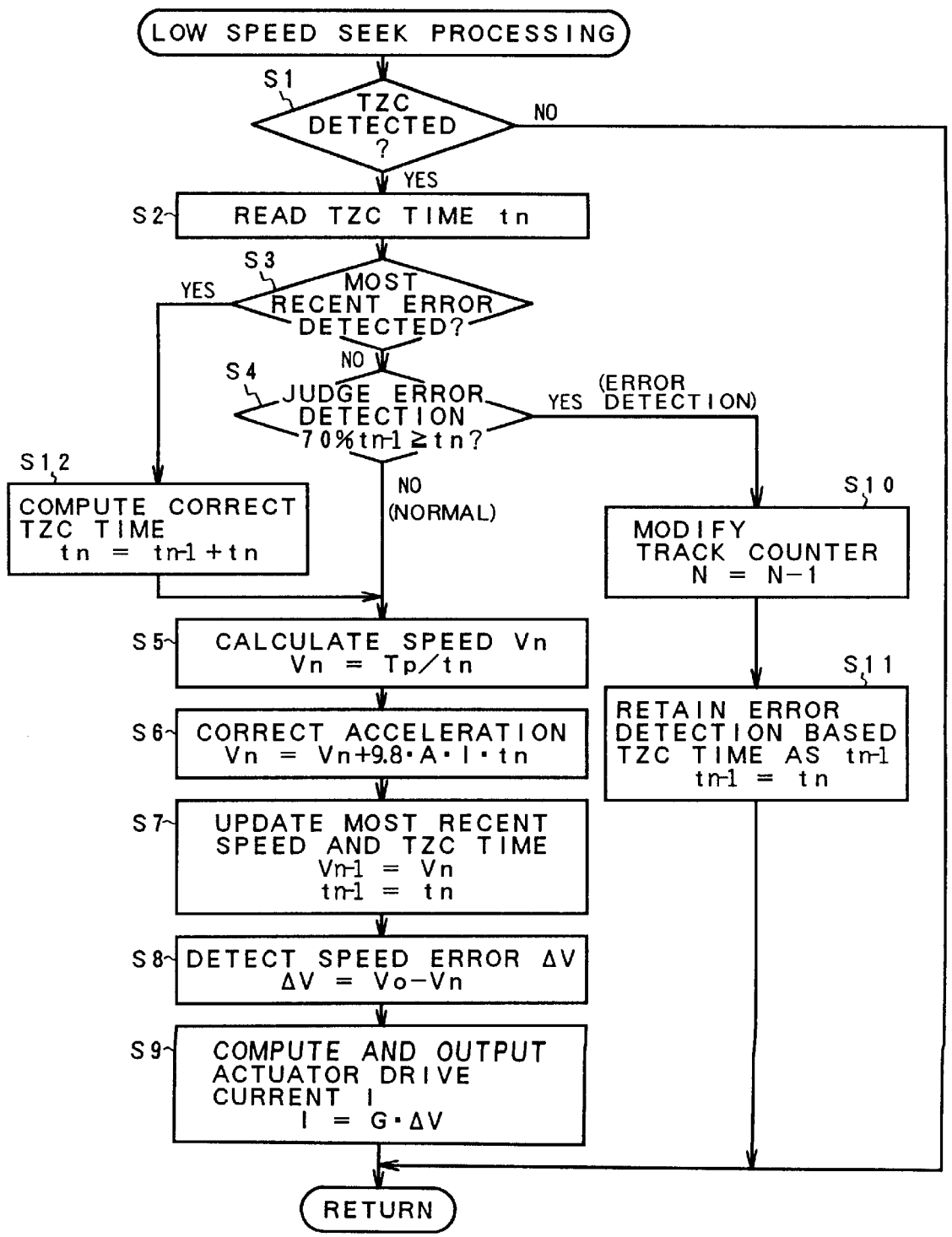
FIG. 12 is a flow chart of another embodiment of the zero-cross error detection and processing corresponding thereto by the low speed seek control unit of FIGS. 9A and 9B.

FIG. 12 is a flow chart of another embodiment of control processing executed by the low speed seek control unit 85 of FIGS. 9A and 9B. This embodiment is characterized in that upon the judgment of presence of the track zero-cross error detection, a proper track zero-cross time is calculated to perform corresponding processing. More specifically, when it is judged that the zero-cross error detection 254 has taken place at time T1 as shown in FIG. 10C, the lens actuator drive current control is not performed at time T1 but instead the length of time t1 from T0 up to T1 is kept. Subsequently, an intrinsic track zero-cross detection occurs at time T2, so that there is obtained the length of time t2 from the zero-cross error detection 254 up to T2, to obtain a zero-cross interval (t1+t2) corresponding to a proper one track pitch Tp from time T0 up to T2, the thus obtained zero-cross interval (t1+t2) being used to perform the speed control. That is, the speed detection unit 112-1 obtains a speed V12 from $$V12 = Tp/(t1+t2) \quad (9)$$

and the speed error detection unit 214 and the gain multiplication unit 216 obtain a drive current for the actuator 64 from $$\begin{aligned} I &= G \cdot (Vr - V12) \quad (10) \\ &= G \cdot \{Vr - Tp/(t1 + t2)\} \end{aligned}$$

and outputs it thereto. Naturally, the speed detection unit 112-1 may perform a speed compensation in accordance with the expression (5).

Referring to the flow chart of FIG. 12, description is made hereinbelow of the low speed seek processing for obtaining a proper track zero-cross time (t1+t2) upon the judgment of the zero-cross error detection. If in step S4 it is judged that a track zero-cross error detection has occurred, sequence goes to step S10 in which the track counter is modified to have a value obtained immediately before the track zero-cross error detection and further to step S11 in which the track zero-cross interval based on the error detection is held as the last time Tn−1. Subsequently, if a track zero cross is detected after the judgment of the zero-cross error detection, the presence of the last error detection is recognized in step S3, and sequence goes to step S12 in which a proper track zero-cross time Tn is obtained as the sum of the current and last zero-cross intervals from $$tn=tn-1+tn \tag{11}$$

to execute the speed control of steps S5 to S9 in the same manner as the normal state free from any zero-cross error detection.

High Speed Seek Control and Zero-cross Error Detection

Figure 13:
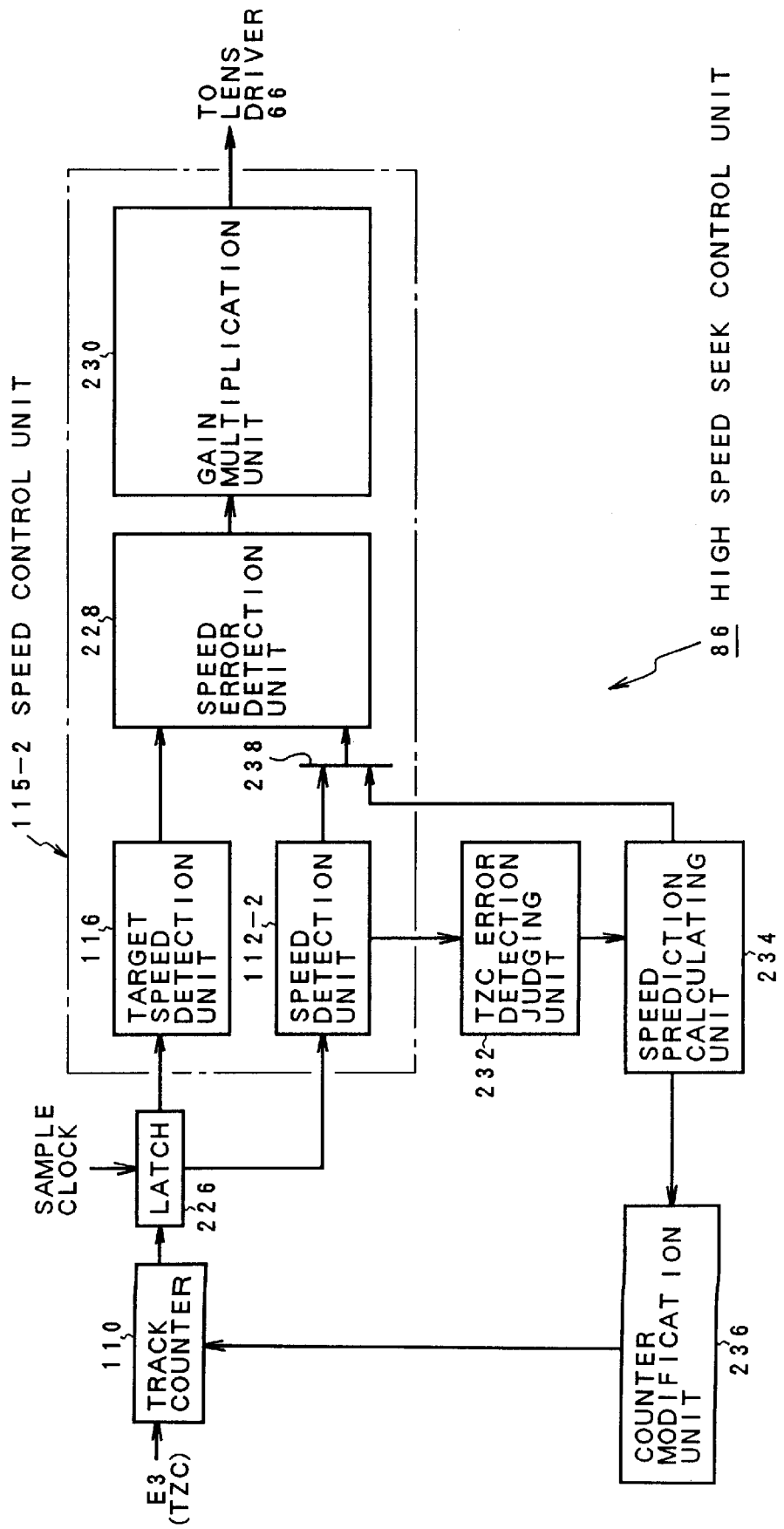
FIG. 13 is a functional block diagram of a high speed seek control unit of the present invention for judging and processing a zero-cross error detection.

FIG. 13 is a functional block diagram of the high speed seek control unit 86 of FIGS. 1A and 1B which executes processing corresponding to the judgment of the track zero-cross error detection. The track counter 110 is followed by a latch unit 226 which serves to latch a value of the track counter 110 by a sampling clock imparted at a cycle based on the sampling frequency 17 kHz of the high speed seek control unit. The high speed seek control unit 85 repeats the operation processing for the speed control at every sampling clock timing. The latch unit 226 is followed by a speed control unit 115-2. The speed control unit 115-2 comprises a speed detection unit 112-2, a target speed setting unit 116, a speed error detection unit 228 and a gain multiplication unit 230. Using a value N1 of the track counter 110 derived from the current latch timing and a value N0 of the track counter 110 derived from the last latch timing, the speed detection unit 112-2 obtains a counter variation $$\Delta N=(N0-N1) \tag{12}$$

and then using a track pitch Tp and a sampling clock cycle ts it obtains a speed V1 from the following expression $$V1=\Delta N \cdot Tp/ts \tag{13}$$

The target speed setting unit 116 performs a setting of a target speed Vr on the basis of the number of remaining tracks to be crossed to reach the target track from the current track position in the track counter 110. The speed error detection unit 228 detects a speed error (Vr−V1). The gain multiplication unit 230 multiplies the speed error by a predetermined gain G to calculate a drive current I for the VCM 68, that is, the carriage actuator in order to drive the VCM 68.

In addition to these, the high speed seek control unit 85 further comprises a track zero-cross error detection judging unit 232, a speed prediction calculating unit 234, a counter modification unit 236 and a selector 238. The track zero-cross error detection judging unit 232 provides either one of the following two judgment modes:

Mode 1: A latch timing speed is predicted and it is judged that a zero-cross error detection has occurred when there is a large difference between the predicted latch timing speed and an actually detected speed; and Mode 2: An acceleration is obtained from the detection speed and is compared with a predicted acceleration by the last latch timing control, and it is judged that a zero-cross error detection has occurred when the obtained acceleration is not more than a predetermined value.

Description will then be made of the zero-cross error detection judgment using the speed prediction of the mode 1. First, relative to the detection speed V1 derived from the expression (13) using a value of the track counter 110 in the speed detection unit 112-2, the track zero-cross error detection judging unit 232 obtains a prediction speed V1p predicted with a current drive of the VCM 68 at the last latch timing, from the following expression $$V1p=V0+9.8 \cdot A \cdot I \cdot ts \tag{14}$$

Herein, V0 represents a speed detected at the last latch timing. Then, the track zero-cross error detection judging unit 232 obtains a speed difference between the detection speed V1 and the prediction speed V from $$\Delta V=V1p-V1 \tag{15}$$

and sets a conditional expression of the absolute value of the speed difference ΔV Absolute value $\Delta V \geq Vth$ and if the absolute value ΔV is equal to or more than the predetermined value Vth, it is judged that a track zero-cross error detection has taken place. In the zero-cross error detection judgment of mode 2, on the contrary, the track zero-cross error detection judging unit 232 calculates an acceleration α, using a detection speed V1 of the expression (13) obtained in the speed detection unit 112-2 and a detection speed V0 at the last latch timing, from $$\alpha=(V0-V1)/ts \tag{16}$$

and sets a conditional expression between the acceleration α and the predefined acceleration threshold value α th $$\alpha \leq \alpha \text{ th} \tag{17}$$

and if the acceleration α is not more than the acceleration threshold value α th, it is judged that a zero-cross error detection has occurred. The acceleration threshold value α th may be for example a 70% value of the acceleration derived from the VCM current over the sampling period. When it is thus judged that a zero-cross error detection has occurred by the track zero-cross error detection judging unit 232 in accordance with the mode 1 or mode 2, the speed prediction calculating unit 234 is activated to calculate a proper prediction speed. A prediction speed Vp by the speed prediction calculating unit 234 is calculated from the expression (14) in the same manner as in the zero-cross error detection judgment of mode 1, and is fed in place of the detection speed V1 of the speed detection unit 112-2, via the selector 238 to the speed error detection unit 228 for obtaining a speed error, which in turn is multiplied by the gain G in the gain multiplication unit 230, allowing a drive current to flow through the VCM 68. A counter modification unit 236 is further provided which calculates a proper variation of the track counter 110 which may occur during the sampling period, from the prediction speed Vp calculated in the speed prediction calculating unit 234 upon the zero-cross error detection judgment in the track zero-cross error detection judging unit 232 and adds the result to the count value at the last sampling timing to obtain a proper current count value. That is, a variation ΔNp of the track counter 110 during the sampling cycle subjected to a zero-cross error detection is obtained from the following expression $$\Delta Np=V1p \cdot ts/Tp \tag{18}$$

The thus obtained prediction variation ΔNp is added to the last count value N0 of the track counter to obtain N1 as follows.

$$N1 = N0 + \Delta Np \quad (19)$$

This value is preset in the track counter 110 to modify the count value.

Figure 14:
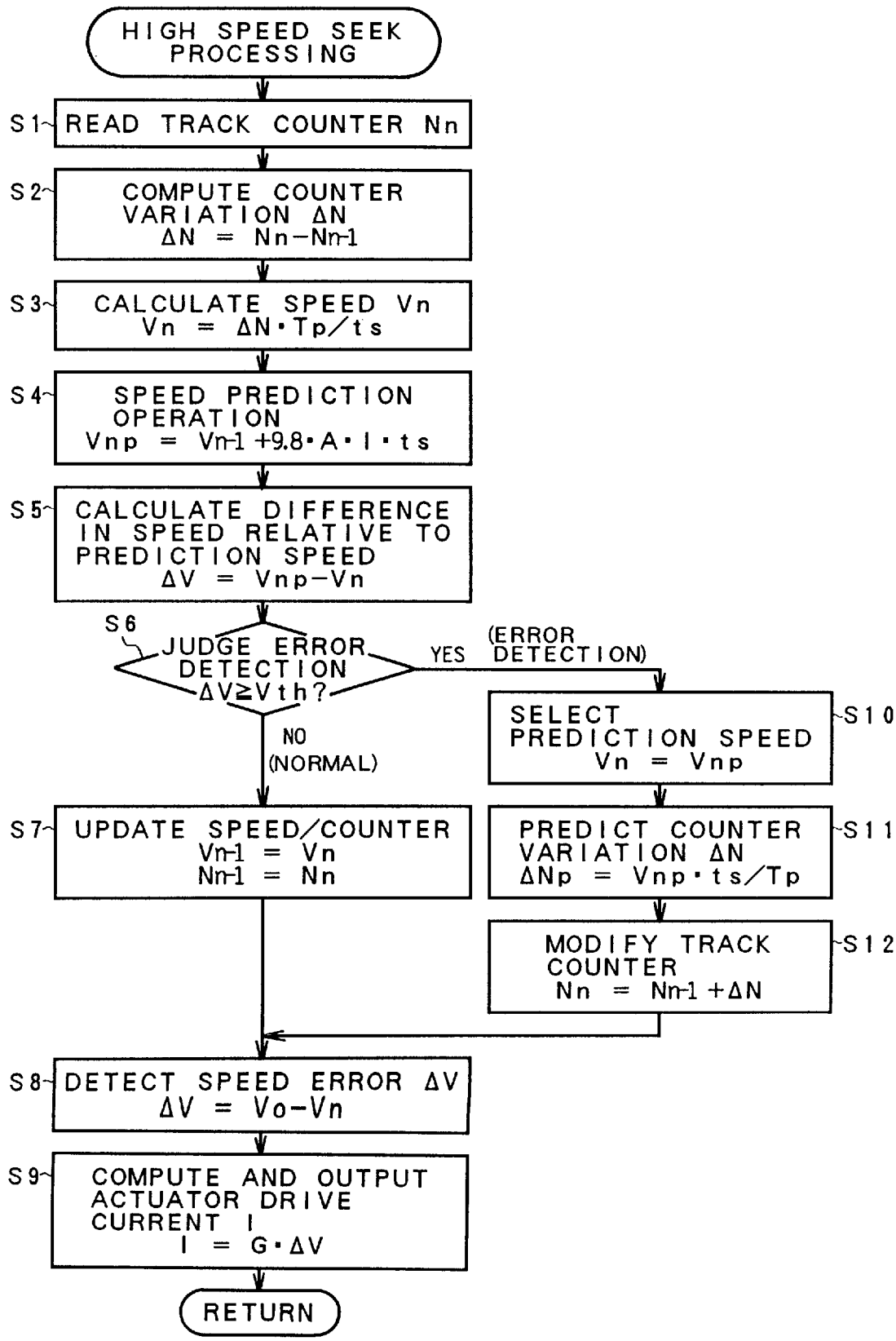
FIG. 14 is a flow chart of the zero-cross error detection and corresponding processing by the high speed seek control unit of FIG. 12.

FIG. 14 is a flow chart obtained when the zero-cross error detection of mode 1 has been employed in the high speed seek control unit 85 of FIG. 13. In the processing employing the mode 1 zero-cross error detection, the speed control is executed each time a sampling clock having a clock frequency of 17 kHz is acquired. In response to the acquisition of a sampling clock, a count value Nn of the track counter 110 at that time is read in step S1, a variation ΔN is calculated which is a difference between the count value Nn and the last count value Nn−1 in step S2, and a speed Vn is calculated in step S3. Then, in step S4 a prediction speed Vnp is calculated and in step S5 a difference is obtained between the prediction speed Vnp and a detection speed Vn. Then, in step S6 the speed difference ΔV is compared with a speed threshold Vth, and if the speed difference ΔV is less than the speed threshold value Vth, it is judged that no zero-cross error detection has occurred, allowing sequence to go to step S7 for updating the detection speed and the track counter value and further to steps S8 and S9 for the speed control of the VCM. On the contrary, if the speed difference ΔV is equal to or greater than the speed threshold value Vth in step S6, it is judged that a zero-cross error detection has occurred, allowing the execution of processing of steps S10 to S12. More specifically, in step S10 a selection is made of the prediction speed Vnp which has already been calculated in step S4, a counter variation ΔN is predicted in step S11, and the track counter 110 is modified in step S12. Then in steps S8 and S9, the speed control is executed on the basis of the prediction speed Vnp.

Figure 15:
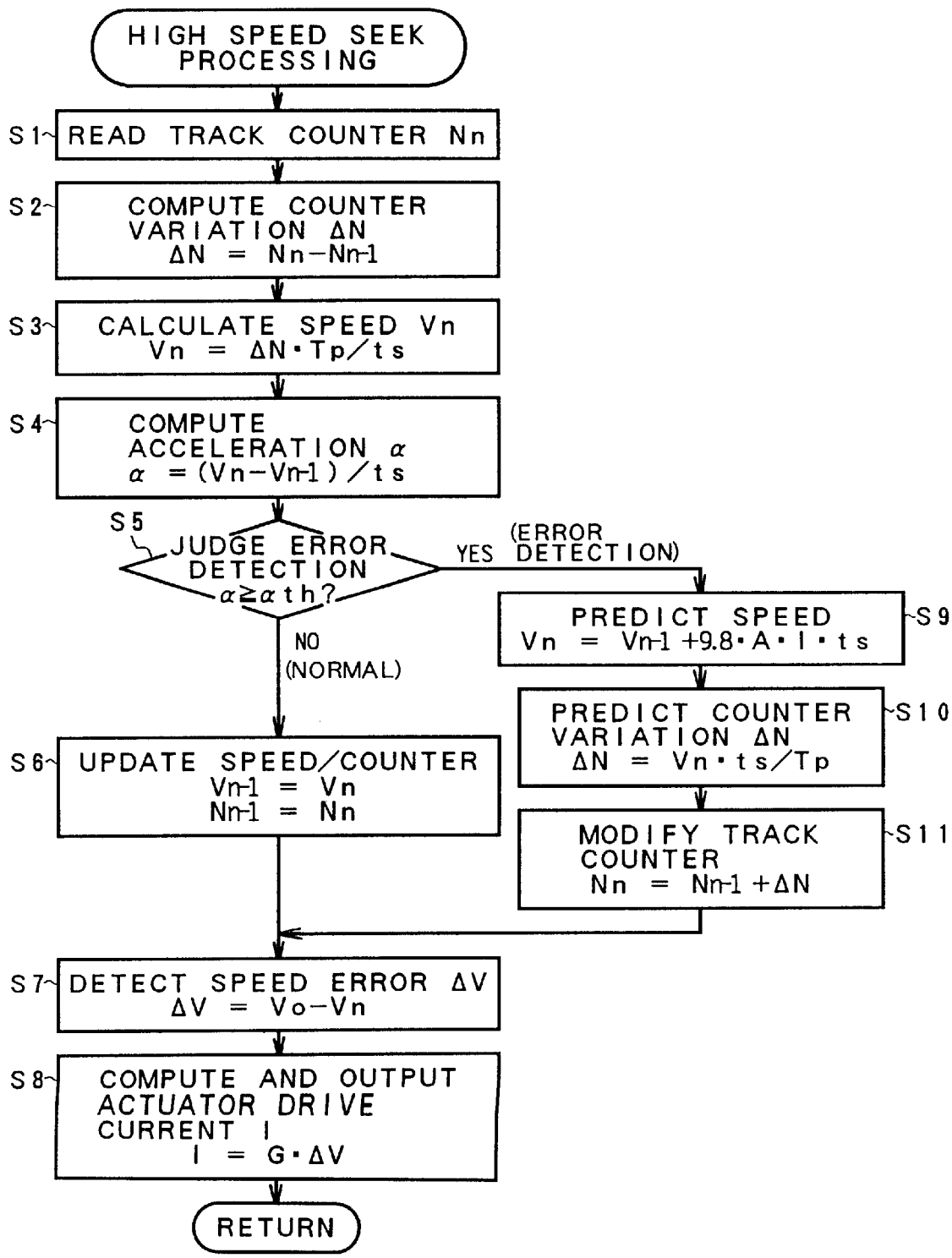
FIG. 15 is a flow chart of another embodiment of the zero-cross error detection and processing corresponding thereto by the high speed seek control unit of FIG. 12.

FIG. 15 is a flow chart of the high speed seek processing for zero-cross error detection in accordance with mode 2. First in step S1 a count value Nn of the track counter 110 is read, in step S2 a counter variation ΔN is calculated, and in step S3 a speed Vn is calculated. Then in step S4 an acceleration α is calculated and in step S5 the acceleration α is compared with an acceleration threshold α th. If the acceleration α is equal to or greater than the acceleration threshold α th, it is judged that no zero-cross error detection has occurred, allowing sequence to go to step S6 for updating the speed and the track counter value and further to steps S7 and S8 for executing the speed control of the VCM. On the contrary, if in step S5 the acceleration α is less than the acceleration threshold α th, it is judged that a zero-cross error detection has taken place, with the result that a speed prediction is performed in step S9, a counter variation ΔN is predicted and calculated in step S10, a track counter modification value is obtained for modification in step S11, and finally VCM speed control is executed in steps S7 and S8.

According to the present invention in this manner, even though an error detection has occurred at or near the zero crossing point of a tracking error signal during seeking operation due to ID fields, noises, etc., this zero-cross error detection is judged to predict a proper speed in the error detection free state to perform the speed control, so that the high speed seek control and low speed seek control are stabilized without being affected by any abnormal speed variation attributable to the zero-cross error detection, thereby improving the seek performance for positioning a beam of light at a target track. Furthermore, the track counter is modified to have a proper count value by judging the zero-cross error detection, so that the track counter is prevented from missing in counting due to the track zero-cross error detection, thus ensuring an accurate positioning of a beam of light at a target track, as well as making it possible to eliminate any need for a retry, reduce the seek time by virtue of the improved seek performance and improve the seek performance of the optical disk drive in its entirety.

Although in the above embodiments the low speed seek control unit 85 of FIGS. 9A and 9B and the high speed seek unit 86 of FIG. 13 are separately depicted in the respective functional block diagrams, the low speed seek control and the high speed seek control do not overlap with each other, so that the functional configurations may naturally be integrated into the low speed seek control unit 85 in such a manner that different processing functions between the high speed seek and the low speed seek can be changed over or that unnecessary functions can be passed by.

Although the best mode for carrying out the present invention is to include both the low speed seek control unit 85 of FIGS. 9A and 9B and the high speed seek control 86 of FIG. 13, the low speed seek control unit 85 of FIGS. 9A and 9B may be combined with a conventional high speed seek control unit or alternatively the high speed seek control unit 86 of FIG. 13 may be combined with a conventional low speed seek control unit. It will be appreciated that the present invention is not intended to be limited by the numerical values used in the above embodiments.

What is claimed is:

1. An optical storage apparatus comprising:

a lens actuator for moving an objective lens through which a beam of light falls on a medium, to the direction across tracks of said medium;

a carriage actuator for moving a carriage on which said lens actuator is mounted, to the direction across said tracks of said medium;

a tracking error signal generating circuit for generating a tracking error signal in response to a position of said beam of light in the direction across said tracks, on the basis of a photosensitive output of a return light from said medium; and a low speed seek control unit for moving at a low speed a beam of light up to a target track, through speed control of said actuator lens;

said low speed seek control unit including:

a zero-cross detection unit for detecting a track zero-crossing of said tracking error signal;

an interval detection unit for detecting an interval of said track zero-crossing;

a speed control unit which detects a speed of a beam of light on the basis of said track zero-cross interval, sets a target speed on the basis of the number of remaining tracks up to said target track in the seeking operation, detects a speed error between said target speed and a detected speed, and drives said lens actuator by a current obtained by multiplying said speed error by a predetermined gain, to allow the detection speed of said beam of light to follow said target speed;

an error detection judging unit for judging an error detection by said zero-cross detection circuit in the seeking operation; and a speed prediction calculating unit which, when it is judged that a zero-cross error detection has occurred during the seeking operation, predictively calculates a correct speed on the basis of the last track zero-cross interval free from any error detection and supplies said predicted speed in place of said detected speed to said speed control unit for the execution of speed control.

2. An optical storage apparatus according to claim 1, wherein said error detection judging unit judges that a zero-cross error detection has occurred when said track zero-cross interval t1 varies beyond a predetermined range based on the last track zero-cross interval t0.

3. An optical storage apparatus according to claim 1, wherein said error detection judging unit judges that a zero-cross error detection has occurred when a detection speed V1 obtained from said track zero-cross interval t1 varies beyond a predetermined range based on a detection speed V0 obtained from the last track zero-cross interval t0.

4. An optical storage apparatus according to claim 1, wherein said error detection judging unit judges that a zero-cross error detection has occurred when an acceleration $\alpha 1$ obtained from said track zero-cross interval t1 varies beyond a predetermined range based on an acceleration $\alpha 0$ obtained from the last track zero-cross interval t0.

5. An optical storage apparatus according to claim 1, wherein said speed prediction calculating unit predictively calculates a correct speed V1p on the basis of the interval t1 by a zero-cross error detection and a detection speed V1 and of the last zero-cross interval t0 free from any error detection.

6. An optical storage apparatus according to claim 5, wherein said speed prediction calculating unit calculates a prediction speed V1p from $$V1p=V1\cdot(t1/t0).$$

7. An optical storage apparatus according to claim 6, wherein said speed prediction calculating unit calculates a prediction speed V1p, using a current I [ampere] fed to said lens actuator, an acceleration property A [G/ampere] and the interval t1 by the a zero-cross error detection, from $$V1p=V1(t1/t0)+9.8\cdot A\cdot I\cdot t1.$$

8. An optical storage apparatus according to claim 5, wherein said speed control unit, when detecting a speed error between a predicted speed V1p of said speed prediction calculating unit and said target speed, modifies said gain G on the basis of the interval t1 at the time of zero-cross error detection and of the last zero-cross interval t0 free from any error detection.

9. An optical storage apparatus according to claim 8, wherein said speed control unit calculates a modified gain Ga from $$Ga=G\cdot(t1/t0).$$

10. An optical storage apparatus according to claim 1, wherein said speed prediction calculating unit predictively calculates a speed on the basis of a time (t1+t2) obtained from adding the first interval t1 up to a zero-cross error detection and a second interval t2 from the zero-cross error detection up to the next zero-cross detection.

11. An optical storage apparatus according to claim 10, wherein said speed prediction calculating units calculates a prediction speed Vp from $$Vp=Tp/(t1+t2)$$

where Tp is a track pitch.

12. An optical storage apparatus according to claim 1, further comprising:
a track counter in which is preset the number of tracks up to a target track at the time of start of seeking operation and which counts down every detection of said track zero-crossing to indicate the number of remaining tracks to be crossed to reach a target track position; and
a counter modification unit for returning the count value of said track counter to a pre-detection value at the time of said zero-cross error detection.

13. An optical storage apparatus according to claim 1, further comprising:
a mask processing unit for inhibiting an input of a tracking error signal into said zero-cross detection circuit for a predetermined time from said zero-cross detection, to thereby prevent any zero-cross error detection.

14. An optical recording apparatus comprising:
a lens actuator for moving an objective lens through which a beam of light falls on a medium, to the direction across tracks of said medium;
a carriage actuator for moving a carriage on which said lens actuator is mounted, to the direction across said tracks of said medium;
a tracking error signal generating circuit for generating a tracking error signal in response to a position of said beam of light in the direction across said tracks, on the basis of a photosensitive output of a return light from said medium; and
a high speed seek control unit for moving at a high speed a beam of light up to a target track, through speed control of said carriage actuator;
said high speed seek control unit including:
a zero-cross detection unit for detecting a track zero-crossing of said tracking error signal;
a track counter in which is preset the number of tracks up to a target track at the time of start of seeking operation and which counts down every detection of said track zero-crossing to indicate the number of remaining tracks to be crossed to reach a target track position;
a latch unit for latching a count value of said track counter every predetermined sampling cycle during a high speed seek;
a speed control unit which detects a speed of a beam of light on the basis of a difference between the current and the last count values which have been latched by said latch unit, sets a target speed on the basis of the number of remaining tracks up to said target track in the seeking operation, detects a speed error between said target speed and a detected speed, and drives said lens actuator by a current obtained by multiplying said speed error by a predetermined gain, to allow the detection speed of said beam of light to follow said target speed;
an error detection judging unit for judging an error detection by said zero-cross detection circuit in the seeking operation;
a speed prediction calculating unit which when it is judged by said error detection judging unit that a zero-cross error detection has occurred, predictively calculates a correct speed and supplies said predicted speed in place of said detected speed to said speed control unit for the execution of speed control; and
a counter modification unit which upon said zero-cross error detection, modifies the count value of said track counter to a correct value.

15. An optical recording apparatus according to claim 14, wherein said error detection judging unit detects an acceleration A of said actuator controlled at the last latch timing, predicts a speed V1p at the current latch timing from a drive current I, and judges that said zero-cross error detection has occurred if a difference between said predicted speed V1p and said detected speed V1 exceeds a predetermined value.

16. An optical recording apparatus according to claim 15, wherein said speed prediction calculating unit calculates a predicted speed V1p at the current latch timing from $$V1p = V0 + 9.8 \cdot A \cdot I \cdot ts.$$

17. An optical recording apparatus according to claim 14, wherein said error detection unit judges that said zero-cross error detection has occurred if an acceleration α obtained from a speed V0 at the last latch timing and from a speed V1 at the current latch timing is less than a predetermined rate of an acceleration α p predicted from a drive current I flowing through said carriage actuator at the last latch timing.

18. An optical recording apparatus according to claim 17, wherein said error detection judging unit judges that said zero-cross error detection has occurred if said detected acceleration α is not more than a threshold value α th obtained by multiplying said predicted acceleration α p by 70%.

19. An optical recording apparatus according to claim 14, wherein said speed prediction calculating unit calculates a predicted speed V2p at the current latch timing, on the basis of a detected speed V0 at the last latch timing, a drive current I [ampere] for said carriage actuator at the last latch timing, an acceleration performance A [G/ampere] of said carriage actuator and a sampling cycle ts of said latch unit.

20. An optical recording apparatus according to claim 14, wherein said counter modification unit predictively calculates a variation ΔN of said track counter throughout a sampling cycle ts, on the basis of a predicted speed Vp calculated by said speed prediction calculating unit, and modifies the count value of said track counter to a correct count value by adding said variation ΔV to the last count value.

21. An optical recording apparatus according to claim 20, wherein said counter modification unit calculates a variation ΔN of said track counter throughout a sampling cycle ts from $$\Delta N = Vp \cdot ts / Tp$$

where Vp is said predicted speed, ts is a sampling cycle and Tp is a track pitch, and
modifies the count value of said track counter to a correct count value by adding said variation ΔN to the last count value.

22. An optical storage apparatus comprising:

a lens moving unit for moving an ofjective lens through which a beam of light falls on a medium, to the direction across tracks of said medium;

a tracking error signal generating circuit for generating a tracking error signal in response to a position of said beam of light in the direction across said tracks, on the basis of a photosensitive output of a return light from said medium; and a seek control unit for moving a beam of light up to a target track, through speed control of said lens moving unit;

said low speed seek control unit including:

a zero-cross detection unit for detecting a track zero-crossing of said tracking error signal;

an interval detection unit for detecting an interval of said track zero-crossing;

a speed control unit which detects a speed of a beam of light on the basis of said track zero-cross interval, sets a target speed on the basis of the number of remaining tracks up to said target track in the seeking operation, detects a speed error between said target speed and a detected speed, and drives said lens moving unit by a current obtained on the basis of multiplying said speed error by a predetermined gain, to allow the detection speed of said beam of light to follow said target speed;

an error detection judging unit for judging an error detection by said zero-cross detection circuit in the seeking operation; and a speed prediction claculating unit which, when it is judged that a zero-cross error detection has occurred during the seeking operation, predictively calculates a correct speed on the basis of the last track zero-cross interval free from any error detection and supplies said predicted speed in place of said detected speed to said speed control unit for the execution of speed control.

23. An optical recording apparatus comprising:

a lens moving unit for moving an objective lens through which a beam of light falls on a medium, to the direction across tracks of said medium;

a tracking error signal generating circuit for generating a trackingerror signal in response to a position of said beam oflight in the direction across said tracks, on the basis of a photosensitive output of a return light from said medium; and a seek control unit for moving at a high speed a beam of light up to a target track, through speed control of said carriage actuator;

said high speed seek control unit including:

a zero-cross detection unit for detecting a track zero-crossing of said tracking error signal;

a track counter in which is present the number of tracks up to a target track at the time of start of seeking operation and which counts down every detection of said track zero-crossing to indicate the number of remaining tracks to be crossed to reach a target track position;

a latch unit for latching a count value of said track counter every predetermined sampling cycle during a speed seek;

a speed control unit which detects a speed of a beam of light on the basis of a difference between the current and the last count values which have been latched by said latch unit, sets a target speed on the basis of the number of remaining tracks up to said target tracks in the seeking operation, detects a speed error between said target speed and a detected speed, and drives said lens moving unit by a current obtained on the basis of multiplying said speed error, to allow the detection speed of said beam of light to follow said target speed;

an error detection judging unit for judging an error detection by said zero-cross detection circuit in the seeking operation;

a speed prediction calculating unit which, when it is judged by said error detection judging unit that a zero-cross error detection has occurred, predictively calculates a correct speed and supplies said predicted speed in place of said detected speed to said speed control unit for the execution of speed control; and a counter modification unit which, upon said zero-cross error detection, modifies the count value of said track counter to correct value.

* * * * *